United States Patent
Kanda

(10) Patent No.: US 9,432,118 B2
(45) Date of Patent: Aug. 30, 2016

(54) APPARATUS AND A METHOD FOR GENERATING, COMPENSATING AND EMULATING POLARIZATION MODE DISPERSION

(75) Inventor: Yoshihiro Kanda, Saitama (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 1099 days.

(21) Appl. No.: 13/536,996

(22) Filed: Jun. 28, 2012

(65) Prior Publication Data

US 2013/0083393 A1 Apr. 4, 2013

(30) Foreign Application Priority Data

Sep. 29, 2011 (JP) ................. 2011-214143
Feb. 20, 2012 (JP) ................. 2012-034313

(51) Int. Cl.
*H04B 10/12* (2006.01)
*H04B 10/00* (2013.01)
*H04B 10/2569* (2013.01)
*G02B 27/28* (2006.01)

(52) U.S. Cl.
CPC ......... *H04B 10/2569* (2013.01); *G02B 27/286* (2013.01)

(58) Field of Classification Search
CPC ............................ H04B 10/30; H04B 10/2569
See application file for complete search history.

(56) References Cited

U.S. PATENT DOCUMENTS

| | | | | |
|---|---|---|---|---|
| 5,930,414 A * | 7/1999 | Fishman | ............ | H04B 10/2569 385/11 |
| 6,674,972 B1 * | 1/2004 | Mecozzi | ............ | H04B 10/2569 398/149 |
| 7,003,183 B1 * | 2/2006 | Phua | ................. | H04B 10/2569 359/489.02 |
| 7,203,423 B1 * | 4/2007 | Mecozzi | ............ | H04B 10/2569 398/150 |
| 7,454,092 B2 * | 11/2008 | Granot | ............... | H04B 10/2569 385/11 |
| 2002/0012487 A1 * | 1/2002 | Damask | ................. | G02B 6/278 385/15 |

(Continued)

FOREIGN PATENT DOCUMENTS

| | | |
|---|---|---|
| JP | 2003-228026 A | 8/2003 |
| JP | 2003228026 A * | 8/2003 |
| JP | 2010078775 A * | 4/2010 |

OTHER PUBLICATIONS

Phua et al., Variable Differential-Group-Delay Module Without Second-Order PMD, 2002, IEEE, pp. 1788-1794.*

(Continued)

*Primary Examiner* — Ken N Vanderpuye
*Assistant Examiner* — Jai Lee
(74) *Attorney, Agent, or Firm* — Rabin & Berdo, P.C.

(57) ABSTRACT

A polarization mode dispersion (PMD) generating apparatus includes a polarization plane controller; a unit function block including a first differential group delay (DGD) generator, a first mode mixer, and a second DGD generator, a second mode mixer and a reflective mirror, which are arranged in this order from the input side of input light free from PMD. Part of the first and second DGD generators is disposed on a driven stage to modify the optical path length. The input light has polarization converted by the polarization plane controller and is inputted to the first DGD generator to propagate back and forth on an optical path from the unit function block through the second mode mixer to the reflective mirror. In the PMD-generating apparatus, the driven stage adjusts a DGD amount between orthogonal eigen-polarization modes generated in the first and second DGD generators on the basis of an applicable wavelength band.

12 Claims, 15 Drawing Sheets

(56) References Cited

U.S. PATENT DOCUMENTS

| | | | |
|---|---|---|---|
| 2002/0075477 A1* | 6/2002 | Yu | H04B 10/2569 356/73.1 |
| 2005/0158055 A1* | 7/2005 | Fukushima | H04B 10/2569 398/152 |
| 2010/0221018 A1* | 9/2010 | Kanda | H04B 10/2569 398/152 |

OTHER PUBLICATIONS

Menyuk et al., Polarization Mode Dispersion, 2005, Springer Science + Business Media, Inc, pp. 291-293.* http://sites.univ-provence.fr/ciml/mk/ens/AOM_EOM.pdf, 2009.*

Pal, Bishnu P., Guided Wave Optical Components and Devices, 2010, Academic Press, p. 21.*

Lianshan Yan et al., "Programmable group-delay module using binary polarization switching," Journal of Lightwave Technology, vol. 21, No. 7, pp. 1676-1684, Jul. 2003.

P. B. Phua et al., "Variable differential-group-delay module without second-Order PMD," Journal of Lightwave Technology, vol. 20, No. 9, pp. 1788-1794, Sep. 2002.

* cited by examiner

FAST OR SLOW AXIS

PRIOR ART

APPARATUS AND A METHOD FOR GENERATING, COMPENSATING AND EMULATING POLARIZATION MODE DISPERSION

BACKGROUND OF THE INVENTION

1. Field of the Invention

The present invention relates to a polarization mode dispersion (PMD) generating apparatus for generating PMD, a PMD-compensating apparatus for compensating PMD and a PMD-emulating apparatus for generating pseudo PMD, and methods therefor.

2. Description of the Background Art

One of the factors restricting the communication performance of high-speed optical communications is distortion of the temporal waveform of optical pulses caused through propagation of the optical pulses carrying an optical signal over an optical fiber transmission line. One of the factors in the distortion is polarization mode dispersion (PMD). PMD is caused by the birefringence structure of an optical fiber transmission line. When optical pulses propagate over an optical fiber, the birefringent property causes a propagation time difference, i.e. differential group delay (DGD), between the orthogonal polarization components of an optical pulse carrier wave. The phenomenon is PMD.

The magnitude or degree of PMD caused on an optical fiber transmission line may be represented by a PMD coefficient [ps/km$^{1/2}$]. According to the Recommendation of the ITU-T (International Telecommunication Union Telecommunication Standardization Sector), the PMD coefficient of a standard single-mode fiber is recommended to be equal to or less than 0.2 ps/km$^{1/2}$.

The average value of DGDs caused in an optical fiber actually installed may be calculated by multiplying its PMD coefficient by a transmission distance. More correctly, (Average value of DGD [ps])=(PMD coefficient [ps/km$^{1/2}$])(Square root of transmission distance [km$^{1/2}$]). For example, for a fiber transmission line of a single-mode optical fiber having a PMD coefficient of 0.2 ps/km$^{1/2}$, the average DGD caused across the distance of 100 km is equal to 2 ps on the basis of (0.2 ps/km$^{1/2}$)×(100$^{1/2}$ km$^{1/2}$)=(0.2×10) ps.

Generally, older optical fiber transmission lines installed in earlier ages tend to raise the PMD coefficients thereof. It was reported that some of optical fiber transmission lines installed in the 1980's had PMD coefficients reaching even up to 5 ps/km$^{1/2}$. Recently, optical fibers having PMD coefficients equal to or less than 0.02 ps/km$^{1/2}$ have been developed.

When expanding optical fiber transmission line networks, in consideration of, for example, economic restriction imposed on the construction cost, such tactics may often be taken that optical fibers are laid on the basis of the principle that aged optical fiber transmission lines installed are to be utilized with new optical fiber transmission lines added thereto. Therefore, optical communications using optical fiber transmission line networks expanded in this way require a technique for reducing the influence of the PMD with a premise taken into account on an optical signal being transmitted over optical fiber transmission lines having large PMD coefficients.

A DGD value estimated from a PMD coefficient is a temporal average value, and has the nature of varying with time. Furthermore, the PMD of an optical fiber forming an optical fiber transmission line, namely PMD vector described below, has its magnitude and direction not constant in the direction of the transmission axis of the optical fiber but randomly varying depending on the distance. Thus, under the circumstances, such an optical fiber can be considered as configured by many short lengths of polarization-maintaining (PM) optical fiber connected in series with the PMD vector of each short length of optical fiber varying randomly. In other words, the optical fiber can be considered as configured by a plurality of divided sections corresponding to the short lengths of PM fiber interconnected in the optical waveguide direction so that each short length of PM fiber has its PMD vector different at random.

Now, the PMD vector is defined as a vector having its magnitude representing the magnitude of a DGD and its direction parallel to a unit Stokes vector in a principal state of polarization.

If the reciprocal of the DGD value of an optical fiber transmission line is larger than the spectrum bandwidth of an optical pulse signal, the influence of higher-order PMD cannot be negligible. Higher-order PMD is known as a phenomenon in which the principal state of polarization (PSP) of an optical fiber changes with respect to the frequency of optical signal or wavelength. The phenomenon is called depolarization. A change in the PSP vector is represented as a rotation of the terminal point of a PMD vector on the Poincare sphere. A difference of the propagation speed between an optical electric-field component parallel to a fast axis and an optical electric-field component parallel to a slow axis is called a polarization-dependent chromatic dispersion (PCD).

The magnitude and direction of a PMD vector generally depend on the wavelength of an optical carrier wave. However, if the spectrum bandwidth of an optical signal is negligible, the PMD vector needs to be treated only for the first-order PMD that is a PMD component free of wavelength dependency. However, if the spectrum bandwidth of an optical signal is not be negligible, the PMD vector needs to be treated also for higher-order PMD that is a PMD component depending on the wavelength.

The case where the spectrum bandwidth of an optical signal is negligible for higher-order PMD is directed to a case where the PMD coefficient in itself of an optical fiber transmission line is small, or where the reciprocal of a DGD value that is possibly be caused on the transmission line is sufficiently smaller than its optical signal band.

Higher-order PMD can also be described as below. When an optical pulse propagates over an optical fiber transmission line, among spectrum components of the optical pulse, a shorter- and a longer-wavelength component are different from each other in direction of the fast and slow axes. In detail, when the waveguide direction of an optical fiber transmission line is represented by the z-axis, the directions of the fast and slow axes of the optical fiber have dependency on the z-axis, so that the directions of the fast and slow axes of the entire transmission line are dependent upon the respective wavelength components. Additionally, the DGD value is also dependent upon the respective wavelength components so that the temporal waveform of the optical pulse deforms complicatedly. As described above, a PMD caused by variations in the directions of the fast and slow axes and by a variation in a DGD value depending on the wavelength will be a higher-order PMD.

The first-order PMD is based on a concept of taking no account of wavelength dependency of PMD. The second-order PMD is a phenomenon in which the wavelength dependency varies at a constant rate. Higher-order PMD is a phenomenon in which the wavelength dependency varies at a more complicated rate instead of a constant rate.

In order to increase a transmission speed, the time width, or duration, of an optical pulse needs to be decreased. If the duration of an optical pulse is decreased, the bandwidth of the spectrum of the optical pulse is increased. Therefore, to estimate the influence of PMD on an optical fiber transmission line in an optical communications system having a high transmission speed, it is important to consider higher-order PMD in addition to the first-order PMD.

As described above, PMD to be considered has its upper limit dependent on the state, given as a PMD coefficient, of an optical fiber transmission line and the length of the bit period of an optical signal. Thus, a solution for alleviating the influence of PMD on an optical fiber transmission line is required. To configure and operate an optical communications system, a solution for testing the tolerance to PMD caused on an optical fiber transmission line is required. However, PMD on an optical fiber transmission line is randomly raised by uncertain factors such as external environment, and hence difficult in reproduction. Thus, an inspection apparatus for generating pseudo PMD on an optical fiber transmission line is required. In the context, such an inspection apparatus may be referred to as a PMD-emulating apparatus or emulator.

Among PMD-compensating methods for alleviating the influence of PMD on an optical fiber transmission line, multilevel modulations have been widely researched which can decrease the symbol rate of a signal without changing a bit rate. The multilevel modulations are exemplified by DQPSK (Differential Quadrature Phase Shift Keying), QAM (Quadrature Amplitude Modulation), and OFDM (Orthogonal Frequency Division Multiplexing).

On a receiver side, there are known the optical compensating method and the electric compensating method. In the optical compensating method, PMD having its property inverse to that of PMD on an optical fiber transmission line or equalize PMD is generated by optical circuits configured by a combination of optical elements to compensate for PMD on the optical fiber transmission line. In the electric compensating method, a received optical signal is optoelectrically converted to equalize a waveform using a transversal filter, which is an analog electronics. Other known electric compensating methods are exemplified by a method for performing A/D (Analog-to-Digital) conversion with a sampling rate twice as high as the symbol rate and equalizing a waveform through digital signal processing by an FIR (Finite-Impulse-Response) filter.

The electric compensating method is excellent in high adaptive equalization speed against a fluctuation in PMD, but is restrictive in its operation depending on the symbol rate of a signal. The method based on digital signal processing requires a high-speed A/D converter and high-speed logics, and is therefore problematic in saving power consumption.

To compare system configurations between both methods, the optical compensating method has a problem that the size of hardware is larger than electronics required by the electric compensating method. The optical compensating method has other problems that a compensation operation speed is slower and that the apparatus is more expensive. However, in the optical compensating method, it is advantageous that the operation has low dependency on the bit rate and modulation format of a signal to be processed, and that the functional components consuming significant electric power are only a portion for physically driving optical elements, thus readily accomplishing low power consumption. Moreover, it is advantageous that a PMD-compensating apparatus for use in the optical compensating method can be used not only as an apparatus for compensating PMD on an optical fiber transmission line as described above but also as a PMD-emulating apparatus for emulating PMD generated on the optical fiber transmission line.

A PMD-generating apparatus for implementing the optical compensating method is configured by a combination of a polarization plane controller and a DGD generator as main constituent elements. Assuming that a DGD on an optical fiber transmission line is reduced to 10% or less of the bit rate period of a signal, the PMD-generating apparatus preferably has its DGD generator adapted to variably change the DGD to compensate for PMD in the range of high-speed signal. Due to the same reason, also when the PMD-generating apparatus is operated as a PMD-emulating apparatus, it is assumed that a high-speed signal is processed so as to preferably have its DGD generator adapted to variably change the DGD to compensate for PMD.

Known types of variable DGD generators capable of variably changing a DGD may include a type adapted to use a mobile mirror mechanically driven for providing difference in optical path length between orthogonal polarization modes and a type including a combination of a birefringent medium and a polarization plane rotation mechanism.

For example, Japanese patent laid-open publication No. 2003-228026 to Kazuhiro Ikeda proposes a variable group delay time imparting unit. Ikeda discloses a variable DGD generator adapted for imparting a predetermined group delay time twice to incident light and variably rotating the state of polarization in the period from the time of imparting the former group delay time to the time of imparting the latter group delay time. This kind of variable DGD generator includes an optical circulator, a Faraday rotator, a PM fiber or a birefringent medium, and a reflective mirror.

Lianshan Yan et al., "Programmable Group-Delay Module Using Binary Polarization Switching", Journal of Lightwave Technology, Vol. 21, No. 7, pp. 1676-1684, July 2003, discloses a variable DGD generator in which plural birefringent media having DGD values related with each other by a power of two are connected through MO (Magnet Optic) switches operative to select the couple of eigen-axes of the birefringent media so as to change in binary the state of polarization between the eigen-axes to render the DGD vary.

Furthermore, Phua et al., "Variable Differential-Group-Delay Module Without Second-Order PMD", Journal of Lightwave Technology, Vol. 20, No. 9, pp. 1788-1794, September 2002, discloses a method for using four birefringent media connected across variable phase shifters to variably generate a DGD while restraining a DGD generator itself from generating a higher-order PMD. An apparatus for implementing this method is one using a variable DGD generator including four birefringent media and three polarization rotation mechanisms.

Features to be required for a PMD-compensating apparatus and a PMD-emulating apparatus include, for example, higher operational speed, miniaturization, highly accurate PMD generation, long-standing stable operation, minimization of higher-order PMD, power saving, insensitivity to external environment, readiness in installation and control, and broader applicable range of wavelength. Particularly, a PMD-generating apparatus for common use in the PMD-compensating apparatus and the PMD-emulating apparatus requires features of capability of generating the first-order PMD with the second-order PMD restraint from being generated, higher operational speed, and readiness in installation and control.

Recently, a PMD tolerance test to a polarization multiplex signal has actively been researched. The PMD-emulating apparatus requires the capability of continuously changing the state of polarization (SOP) of light outputted when changing a PMD vector and similar to PMD generated on an installed optical fiber.

It was observed that PMD on an optical fiber transmission line varied at a speed of millisecond order. Therefore, a PMD-generating apparatus including a PMD-compensating apparatus and a PMD-emulating apparatus requires its operation speed applicable to the observed speed. However, the mechanical mobile mirror is limitative in adjusting speed of DGD to several ten milliseconds. Furthermore, the mobile mirror may be inferior in mobile portions possibly malfunctioning due to abrasion or vibration through a long-term operation. Thus, the PMD-generating apparatus using a DGD generator including a mechanical mobile mirror involves difficulty in long-term high speed and stable operation.

In a variable DGD generator disclosed in Lianshan Yan et al., in which the birefringent media are connected through the MO switches operative to select a couple of eigen-axes of the birefringent media so as to change in binary the state of polarization between the eigen-axes to vary a DGD, the generable DGD value is limited to discrete values depending on a combination of birefringent media. Therefore, in order to generate highly accurate PMD, the DGD value has to be changed in minute steps. Thus, many birefringent media and MO switches are needed. Additionally, a delay difference between the orthogonal eigen-axes is switched at a speed of picosecond order together with operation of varying a DGD, thereby the output SOP from the DGD generator abruptly changing. Furthermore, when switching the amount of DGD to be generated, the eigen-axes of plural birefringent media are not orthogonal to each other in a period from the start to the end of the switching. Therefore, higher-order PMD may be generated in that period, also being problematic.

In the solution disclosed in Ikeda stated earlier for continuously rotating the SOP between plural birefringent media to change a mode coupling state between the birefringent media, a DGD value observed in a specific wavelength can be continuously changed. However, the second-order PMD is generated, which is problematic.

A DGD value $\tau$ generated in the DGD generator and the magnitude $|\tau_\omega|$ represented by the absolute value of the DGD of the second-order PMD value, respectively, are given by expressions (1) and (2):

$$\tau = (\tau_1^2 + \tau_1^2 + 2\tau_1\tau_2 \cos 2\theta)^{1/2} \quad (1)$$

$$|\tau_\omega| = \tau_1 \tau_2 \sin 2\theta \quad (2)$$

where $\tau_1$ and $\tau_2$ are the magnitudes of DGDs of the respective two birefringent media, and 6 is a polarization plane rotation amount therebetween.

The solution disclosed in Phua et al., can continuously vary the magnitude of a DGD and reduce the generation of higher-order PMD. In the respective unit function blocks, a variable polarization rotator rotates the state of polarization to vary the DGD value according to the expression (1). With this operation, the second-order PMD given by the expression (2) is generated. However, the nature of the first-order PMD vector orthogonal to the second-order FMD vector in the Stokes space can be used to cancel the second-order PMD component while maintaining only the first-order PMD component.

That solution uses the symmetric structure of two unit function blocks having equal PMD vectors to cancel the second-order PMD component, and generates the first-order PMD component. Therefore, those unit function blocks are required to have the same optical property as each other. Thus, four birefringent media and two polarization plane rotators in total need to have the same optical property as each other.

Uniformity has to be assured of the DGD values in the respective birefringent media and the polarization plane rotation amounts of the polarization plane rotators. However, in practice, it is significantly difficult to select and lay birefringent media and polarization plane rotators satisfying the above conditions and to control the two polarization plane rotators so as to be equalized in optical property.

The variable DGD generator implementing the solution disclosed in Phua et al., has a couple of mode mixers adapted to be controlled so as to operate completely equivalently to each other. This requires, for example, accurate temperature adjustment and maintaining the relative relationship of phase between devices, resulting in many difficulties in control and installation. The second-order PMD in the wavelength of the optical carrier wave can be canceled. However, depending on a DGD generated in the birefringent medium, the free spectral range (FSR) is determined, thus limiting an applicable band. According to Phua et al., the FSR is given as $1/(2\tau)$ where r is the absolute value of a PMD vector, i.e. the magnitude of a DGD generated in a birefringent medium.

Recently, there have been researched modulation formats such as OFDM, QPSK, and QAM which may occupy different frequency bandwidths although having the same transmission speeds. Therefore, a PMD-generating apparatus is expected which can variably change a compensation wavelength band and/or an emulation band.

The mechanical implementation can thus generate PMD having a significantly flat wavelength property, but is problematic in its insufficient response speed.

As described above, the conventional art can implement a PMD-generating apparatus that can continuously change a PMD value at a speed of millisecond order or less but is difficult in accomplishing a PMD-generating apparatus that can determine an applicable wavelength band.

SUMMARY OF THE INVENTION

It is therefore an object of the present invention to provide a PMD-generating apparatus and a method therefor that can continuously variably generate the first-order PMD and can variably set an applicable wavelength band with the second-order PMD reduced from being generated.

It is therefore another object of the present invention to provide a PMD-compensating apparatus and a PMD-emulating apparatus using the PMD-generating apparatus, and a method therefor.

In accordance with the present invention, a polarization mode dispersion (PMD) generating apparatus includes a first differential group delay (DGD) generator, a first mode mixer, a second DGD generator, a second mode mixer, and a reflective mirror, which are arranged in this order, wherein each of the first and second DGD generators includes a DGD adjustment mechanism variably adjusting a DGD amount between orthogonal eigen-polarization modes generated in the first and second DGD generators, respectively, and input signal light is inputted from the first DGD generator to propagate back and forth on an optical path from the first DGD generator through the first mode mixer, the second DGD generator and the second mode mixer to the reflective mirror, whereby a first-order PMD is added to the input signal light with a second-order PMD canceled which was raised along with generation of the first-order PMD to generate a PMD-added optical signal.

In accordance with one aspect of the invention, a PMD-compensating apparatus includes a PMD-generating apparatus, a polarization analyzer, a calculator, and a driver, the PMD-compensating apparatus receiving input signal light to generate equalization PMD equalizing PMD of the input signal light, and adding the equalization PMD to the input signal light to generate and output a PMD-compensated optical signal, wherein the PMD-generating apparatus includes a first DGD generator, a first mode mixer, a second DGD generator, a second mode mixer, and a reflective mirror, which are arranged in this order, each of the first and second DGD generators includes a DGD adjustment mechanism variably adjusting a DGD amount between orthogonal eigen-polarization modes generated in the first and second DGD generators, respectively, the input signal light is inputted from the first DGD generator to propagate back and forth on an optical path from the first DGD generator through the first mode mixer, the second DGD generator and the second mode mixer to the reflective mirror, thereby adding tentative equalization PMD to the input signal light to thereby generate a tentative PMD-compensated optical signal, the polarization analyzer digitizes and outputs a magnitude of PMD of the tentative PMD-compensated optical signal as PMD-compensating parameters, the calculator uses the PMD-compensating parameters to calculate and output a PMD-compensating instruction signal for generating the equalization PMD so as to decrease the magnitude of PMD of the tentative PMD-compensated optical signal, and the driver uses the PMD-compensating instruction signal to control the PMD-generating apparatus so as to add the equalization PMD to the input signal light to generate the PMD-compensated optical signal.

In accordance with another aspect of the invention, a PMD-emulating apparatus includes a PMD-generating apparatus, a polarization analyzer, a calculator, a driver and a principal-state-of-polarization (PSP) controller, the PMD-emulating apparatus receiving input signal light not including PMD to generate a PMD-including optical signal obtained by emulating and adding a predetermined magnitude of PMD, and adjusting a PSP of the emulated PMD-including optical signal to a predetermined PSP value to output a resultant optical signal, wherein the PMD-generating apparatus includes a first DGD generator, a first mode mixer, a second DGD generator, a second mode mixer, and a reflective mirror, which are arranged in this order, each of the first and second DGD generators includes a DGD adjustment mechanism variably adjusting a DGD amount between orthogonal eigen-polarization modes generated in the first and second DGD generators, respectively, the input signal light is inputted from the first DGD generator to propagate back and forth on an optical path from the first DGD generator through the first mode mixer, the second DGD generator and the second mode mixer to the reflective mirror, thereby adding tentative equalization PMD to the input signal light to generate a tentative PMD-including optical signal, the polarization analyzer digitizes and outputs a magnitude of PMD of the tentative PMD-including optical signal as PMD parameters, the calculator uses the PMD parameters to output a PMD-adding instruction signal so as to approximate the magnitude of PMD of the tentative PMD-including optical signal to a predetermined PMD value, the driver uses the PMD-adding instruction signal to control the PMD-generating apparatus and the PSP controller so as to generate the emulated PMD-including optical signal, and the PSP controller adjusts the PSP of the tentative PMD-including optical signal to the predetermined PSP value to output the resultant optical signal.

In accordance with still another aspect of the invention, a PMD-generating method for inputting input signal light to an optical path defined by a first differential group delay (DGD) generator, a first mode mixer, a second DGD generator, a second mode mixer and a reflective mirror arranged in this order to propagate the input signal light back and forth on the optical path to thereby generate PMD, and adding the PMD to the input signal light to generate a PMD-added optical signal comprises: a first step of generating a DGD as a propagation time difference between orthogonal polarization components of the input signal light to generate the first-order PMD by the first DGD generator; a second step of canceling the second-order PMD raised along with generation of the first-order PMD by the second DGD generator; and a third step of setting in the first and second steps an amount of the DGD so as to match the amount with a free spectral range determined by a wavelength band of the input signal light by simultaneously adjusting the first and second DGD generator.

Further in accordance with still another aspect of the invention, a PMD-generating method for inputting input signal light to an optical path defined by a first DGD generator, a first mode mixer, a second DGD generator, a second mode mixer and a reflective mirror arranged in this order to propagate the input signal light back and forth on the optical path to thereby generate PMD, and adding the PMD to the input signal light to generate a PMD-added optical signal comprises: a first step of generating a DGD as a propagation time difference between orthogonal polarization components of the input signal light to generate the first-order PMD by the first DGD generator; a second step of canceling the second-order PMD raised along with generation of the first-order PMD by the second DGD generator; and a third step of setting in the first and second steps an amount of the DGD so as to match the amount with a free spectral range determined by a wavelength band of the input signal light by simultaneously adjusting the first and second DGD generator.

Further in accordance with still another aspect of the invention, a PMD-compensating method for inputting input signal light to an optical path of a PMD-generating apparatus including a first DGD generator, a first mode mixer, a second DGD generator, a second mode mixer and a reflective mirror arranged in this order, wherein the input signal light propagates back and forth on the optical path to thereby generate equalization PMD equalizing PMD of the input signal light, and adding the equalization PMD to the input signal light to generate a PMD-compensated optical signal, comprises: a first step of generating tentative equalization PMD and adding the tentative equalization PMD to the input signal light to generate a tentative PMD-compensated optical signal by the PMD-generating apparatus; a second step of digitizing and outputting a magnitude of PMD of the tentative PMD-compensated optical signal as PMD-compensating parameters by a polarization analyzer; a third step of using the PMD-compensating parameters to calculate and output a PMD-compensating instruction signal for generating the equalization PMD so as to decrease the magnitude of PMD of the tentative PMD-compensated optical signal by a calculator; a fourth step of using the PMD-compensating instruction signal to control a value of PMD of the PMD-compensated optical signal to output the PMD-compensated optical signal by a driver; and a fifth step of setting in the first step an amount of a DGD between orthogonal eigen-polarization modes of the input signal light so as to match the amount with a free spectral range determined by a wavelength band of the input signal light.

Further in accordance with still another aspect of the invention, a PMD-compensating method for inputting input signal light to an optical path defined by a polarization plane controller, a first DGD generator, a first mode mixer, a second DGD generator, a second mode mixer and a reflective mirror arranged in this order, wherein the input signal light propagates back and forth on the optical path to thereby generate equalization PMD equalizing PMD of the input signal light, and adding the equalization PMD to the input signal light to generate a PMD-compensated optical signal, comprises: a first step of arbitrarily adjusting a state of polarization of the input signal light by the polarization plane controller; a second step of generating tentative equalization PMD and adding the tentative equalization PMD to the input signal light to generate a tentative PMD-compensated optical signal by a PMD-generating apparatus, the PMD-generating apparatus including the first DGD generator, the first mode mixer, the second DGD generator, the second mode mixer and the reflective mirror; a third step of digitizing and outputting a magnitude of PMD of the tentative PMD-compensated optical signal as PMD-compensating parameters by a polarization analyzer; a fourth step of using the PMD-compensating parameters to calculate and output a PMD-compensating instruction signal for generating the equalization PMD so as to decrease the magnitude of PMD of the tentative PMD-compensated optical signal by a calculator; a fifth step of using the PMD-compensating instruction signal to control a value of PMD of the PMD-compensated optical signal to output the PMD-compensated optical signal by a driver; and a sixth step of setting in the first step an amount of a DGD between orthogonal eigen-polarization modes of the input signal light so as to match the amount with a free spectral range determined by a wavelength band of the input signal light.

Further in accordance with still another aspect of the invention, a PMD-emulating method for inputting input signal light not including PMD to an optical path of a PMD-generating apparatus defined by a first DGD generator, a first mode mixer, a second DGD generator, a second mode mixer and a reflective mirror arranged in this order, wherein the input signal light propagates back and forth on the optical path to thereby add a predetermined magnitude of PMD to the input signal light to generate an emulation PMD-including optical signal having a predetermined principal state of polarization (PSP), comprises: a first step of generating tentative equalization PMD and adding the tentative equalization PMD to the input signal light to generate a tentative PMD-including optical signal by the PMD-generating apparatus; a second step of digitizing and outputting the magnitude of PMD of the PMD-including optical signal as PMD parameters by a polarization analyzer; a third step of using the PMD parameters to output a PMD-adding instruction signal so as to approximate a magnitude of PMD of the PMD-including optical signal to the predetermined PMD value by a calculator; a fourth step of using the PMD-adding instruction signal to control the PMD value of the PMD-including optical signal to generate the emulation PMD-including optical signal by a driver; a fifth step of rotating a polarization plane of the emulation PMD-including optical signal to output the emulation PMD-including optical signal having the predetermined PSP value by a PSP controller; and a sixth step of setting in the first step an amount of a DGD between orthogonal eigen-polarization modes of the input signal light so as to match the amount with a free spectral range determined by a wavelength band of the input signal light.

Further in accordance with still another aspect of the invention, a PMD-emulating method for inputting input signal light not including PMD to an optical path defined by a polarization plane controller, a first DGD generator, a first mode mixer, a second DGD generator, a second mode mixer and a reflective mirror arranged in this order, wherein the input signal light propagates back and forth on the optical path to thereby add a predetermined magnitude of PMD to the input signal light to generate an emulation PMD-including optical signal having a predetermined PSP, comprises: a first step of arbitrarily adjusting a state of polarization of the input signal light by the polarization plane controller; a second step of generating tentative PMD and adding the tentative PMD to the input signal light to generate a tentative PMD-including optical signal by a PMD-generating apparatus, the PMD-generating apparatus comprising the first DGD generator, the first mode mixer, the second DGD generator, the second mode mixer and the reflective mirror; a third step of digitizing and outputting a magnitude of PMD of the PMD-including optical signal as PMD parameters by a polarization analyzer; a fourth step of using the PMD parameters to output a PMD-adding instruction signal so as to approximate the magnitude of PMD of the PMD-including optical-signal to a predetermined PMD value by a calculator; a fifth step of using the PMD-adding instruction signal to control the PMD value of the PMD-including optical signal to generate the emulation PMD-including optical signal by a driver; a sixth step of rotating a polarization plane of the emulation PMD-including optical signal to output the emulation PMD-including optical signal having the predetermined PSP value by a PSP controller; and a seventh step of setting in the second step an amount of a DGD between orthogonal eigen-polarization modes of the input signal light so as to match the amount with a free spectral range determined by a wavelength band of the input signal light.

In accordance with a PMD-generating apparatus of the present invention, input signal light not including PMD is inputted from the first DGD generator to propagate back and forth on an optical path from the first DGD generator through the first mode mixer, the second DGD generator, and the second mode mixer to the reflective mirror, and is outputted to thereby result in reciprocal propagation of the input signal light through a single unit function block including the first DGD generator, the first mode mixer, and the second DGD generator. This accomplishes a function equivalent to that of a PMD-generating apparatus configured by symmetrically arranging about a mode mixer a couple of identical unit function blocks.

More specifically, this implements a PMD-generating apparatus based on a reflective system to perform reciprocal propagation of input signal light through a single unit function block, thereby performing operations equivalent to propagation of input signal light through the two identical unit function blocks. Therefore, the single unit function block is shared with and used for onward and backward paths for the input signal light. This only has to control optical properties such as a polarization plane rotation amount of the single unit function block. The problem in the conventional art is overcome that the two identical unit function blocks were required to be arranged to be controlled so as to equalize optical properties thereof.

Since only one unit function block is necessary, the PMD-generating apparatus may be simply configured and readily controlled.

Furthermore, the first and second DGD generators each include a DGD adjustment mechanism for variably adjusting a DGD amount between orthogonal eigen-polarization modes generated in the first and second DGD generators, and can therefore adjust and set a DGD value to be generated in the first and second DGD generators so as to match the DGD value with an applicable wavelength band. Therefore, a PMD-generating apparatus may be implemented which can variably select and set an applicable wavelength band.

In the PMD-generating apparatus of the present invention, a polarization plane controller is provided in the stage preceding the first DGD generator to thereby adjust polarization. The adjustment of polarization corresponds to equalizing the SOP of the polarization component passing the fast axis of the transmission line to the slow axis of the PMD-generating apparatus. In the emulating apparatus, the adjustment of polarization is equivalent to adjustment of the power distribution ratio of the fast axis to the slow axis of the PMD-generating apparatus.

To effectively reduce the generation of the second-order PMD, the second-order PMD vector giving the second-order PMD caused on an onward path is required to be equal in magnitude and opposite in direction to the second-order PMD vector giving the second-order PMD generated on a backward path. Specifically, the rotative direction of an SOP on the onward path is preferably equal to, or in consistent with, the rotative direction of an SOP on the backward path. Thus, constituent elements for use in converting a polarization axis by the first mode mixer may be arranged symmetrically on onward and backward optical paths to thereby allow the second-order PMD vector giving the second-order PMD generated on the onward path to be equal in magnitude and opposite in direction to the second-order PMD vector giving the second-order PMD generated on the backward path.

In accordance with a PMD-compensating apparatus of the present invention, the PMD-generating apparatus described above adds tentative PMD to input signal light to generate a tentative compensated optical signal including the added PMD, a polarization analyzer analyzes the generated tentative PMD-compensated optical signal to obtain PMD-compensating parameters, a calculator calculates a PMD-compensating instruction signal on the basis of the PMD-compensating parameters, and a driver controls the PMD-generating apparatus on the basis of the PMD-compensating instruction signal. This can provide a PMD-compensating apparatus for generating equalization PMD to produce a compensated optical signal obtained by adding the generated equalization PMD to the input signal light.

In accordance with a PMD-emulating apparatus of the present invention, an apparatus can be provided in which the PMD-compensating apparatus described above controls the PMD-generating apparatus and a PSP controller on the basis of a PMD-compensating instruction signal, and the PSP controller adjusts to a predetermined principal state of polarization the principal state of polarization of a tentative PMD-compensated optical signal from the PMD-compensating apparatus.

In accordance with a PMD-generating method, a PMD-compensating method, and a PMD-emulating method of the present invention, input signal light is inputted from the first DGD generator to propagate back and forth on an optical path from the first DGD generator through the first mode mixer, the second DGD generator, and the second mode mixer to the reflective mirror. A DGD as a propagation time difference between orthogonal polarization components of the input signal light is generated as the frequency dependency of PMD on the path to generate the first-order PMD and to cancel the second-order PMD raised together with generation of the first-order PMD. In the generation of the first-order PMD and the canceling of the second-order PMD, a DGD amount is set so as to be matched with an FSR determined by a wavelength band of the input signal light. The central wavelength of the FSR is arbitrarily shifted by the polarization rotation amount generated in the second DGD generator to thereby output an optical signal obtained by adding the PMD to the input signal light not including PMD. In compensating of PMD, output signal light including the added PMD is used as a tentative PMD-compensated optical signal to analyze the polarization of the tentative PMD-compensated optical signal. On the basis of obtained PMD-compensating parameters, a PMD-compensating instruction signal is calculated to control the PMD value on the basis of the instruction signal and to output an equalization PMD-compensated optical signal. In emulating of PMD, in addition to analysis of the polarization of the tentative PMD-compensated optical signal, calculation of the instruction signal and control of the PMD value exerted by the instruction signal, the PSP of the tentative PMD-compensated optical signal is adjusted to a predetermined PSP value on the basis of the instruction signal to thereby match the central wavelength of the FSR with the central wavelength of a grid of WDM (Wavelength Division Multiplexing) communication. This can be used as an emulating apparatus capable of evaluating a WDM signal collectively.

In accordance with those methods of the present invention, the SOP of input signal light is arbitrarily adjusted before generating the first-order PMD to thereby accomplish conversion to an arbitrary SOP and control on an SOP to be inputted to the first DGD generator, even while the direction of the coordinate axis defining PSP of the polarization mode of the input signal light fluctuates.

BRIEF DESCRIPTION OF THE DRAWINGS

The objects and features of the present invention will become more apparent from consideration of the following detailed description taken in conjunction with the accompanying drawings in which.

DESCRIPTION OF THE PREFERRED EMBODIMENTS

Figure 5:
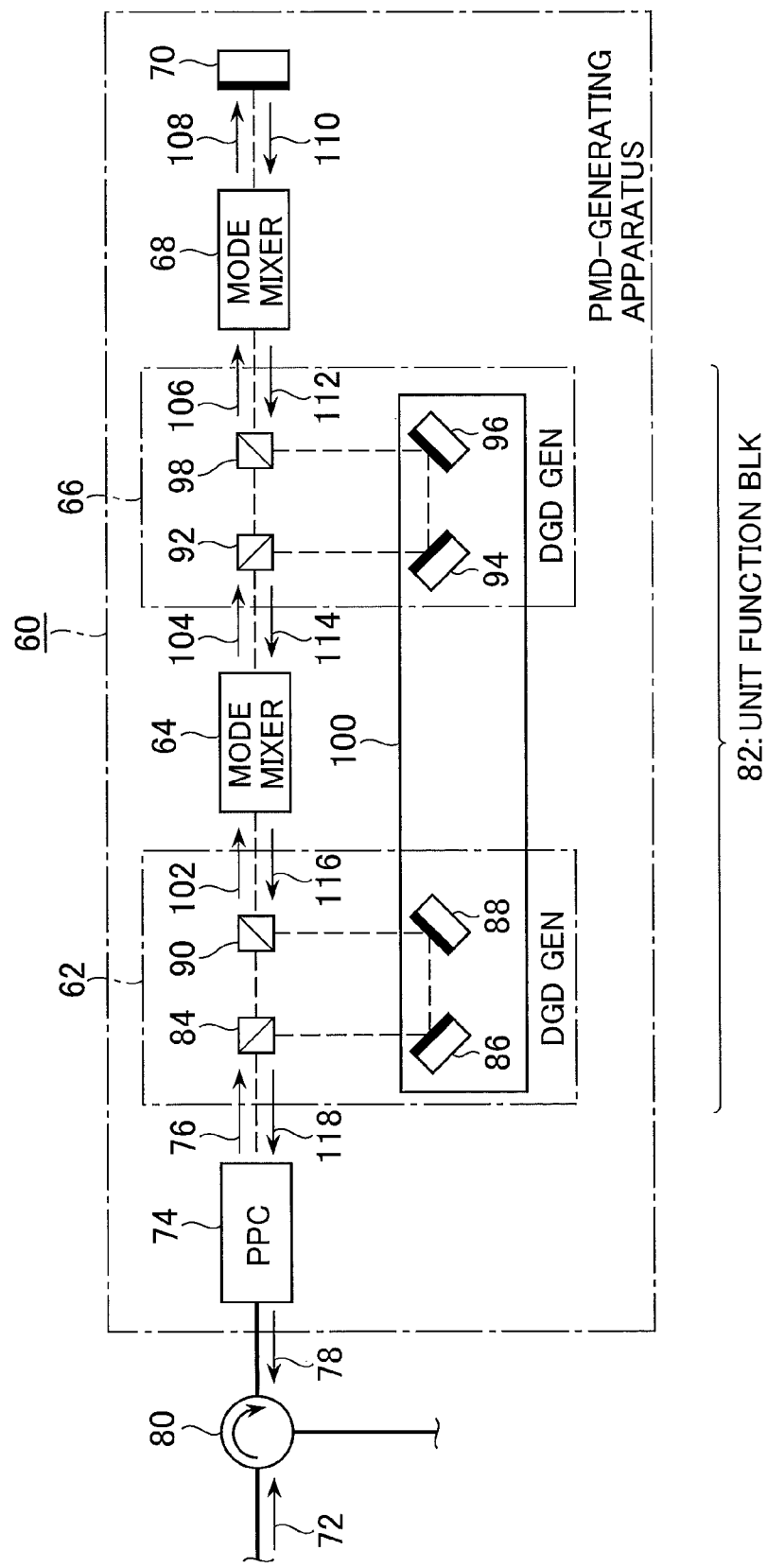
FIG. 5 is a schematic block diagram showing a configuration of a PMD-generating apparatus in accordance with an embodiment of the present invention.

Well, reference will be made to accompanying drawings to describe in detail a polarization mode dispersion (PMD) generating apparatus in accordance with preferred embodiments of the present invention. First, FIG. 5 shows a PMD-generating apparatus 60 in accordance with an embodiment of the present invention. The PMD-generating apparatus 60 includes a differential group delay (DGD) generator 62, a mode mixer 64, a DGD generator 66, another mode mixer 68, and a reflective mirror 70, which are disposed in this order on a substrate, not shown. The DGD generators 62 and 66 each include a DGD adjustment mechanism for variably adjusting a DGD amount between orthogonal eigen-polarization modes generated in the respective DGD generators 62 and 66. Input signal light 72 not including PMD is inputted from the DGD generator 62 to propagate back and forth on an optical path from the DGD generator 62 through the mode mixer 64, the DGD generator 66 and the mode mixer 68 to the reflective mirror 70. Thus, the first-order PMD is added to the input signal light 72 while canceling the second-order PMD generated upon generation of the first-order PMD to thereby generate a PMD-added optical signal 78.

The PMD-generating apparatus 60 thus structured implements a function equivalent to that of a PMD-generating apparatus which would have a couple of unit function blocks disposed symmetrically about a mode mixer and having the same configuration. In other words, this implements a PMD-generating apparatus based on a reflective system to allow input signal light to propagate back and forth one and the same unit function block, thereby implementing operations equivalent to propagation of input signal light through a couple of identical unit function blocks. The single unit function block is thus shared with and used reciprocally for the input signal light. It is therefore sufficient to control optical properties or parameters such as a polarization plane rotation amount of one and the same unit function block. The PMD-generating apparatus may thus be configured simply and controlled readily.

Elements or portions not directly relevant to understanding the present invention will neither be described nor shown. In the description, signals are designated with reference numerals for connection lines on which they appear.

FIGS. 5 to 13 show configuration examples in accordance with the present invention, and schematically depict the positional relationship between of the structural elements and other matters merely for the purpose of assistance in understanding the present invention, and therefore would not restrict the invention to the illustrative examples. In the following description, specific elements or operating conditions may be described. Of course, such elements and operating conditions may simply be for use in illustrating preferred embodiments, and the invention would therefore not be limited to those elements or operating conditions.

<PMD-Generating Mechanism and Basic Concept of PMD Compensation>

In order to facilitate understanding problems to be solved, a PMD-generating apparatus, a PMD-compensating apparatus, and a PMD-emulating apparatus in accordance with the invention, reference will be made to FIGS. 1 to 4 to specifically describe how PMD is generated, and the first-, second- and higher-order PMD.

One of the factors restricting communication performance in optical communications is, as described earlier, distortion of the temporal waveform of an optical pulse, carrying an optical signal, caused when the optical pulse propagates over an optical fiber transmission line. One of the factors in the distortion of the temporal waveform of an optical pulse is PMD, which is caused for the following reason.

Due to the manufacturing errors in manufacturing processes of an optical fiber and the stresses caused by, for example, bending, twisting and pressing which may be encountered when laying an optical fiber transmission line, the core of the optical fiber has it cross-section distorted in shape from a true circle. This may cause the optical fiber to have a birefringent property. The birefringent property may result in a phenomenon in which the phase speed of an optical pulse propagating over the optical fiber depends on the vibratory direction of an optical electric-field. The vibratory direction in which the phase speed of an optical pulse increases is called a fast axis, and the vibratory direction in which the phase speed decreases is called a slow axis.

When an optical pulse propagates over an optical fiber, a difference in propagation speed between the vibratory components in the fast and slow axis directions of the electric-field component causes DGD between the orthogonal polarization components of the optical pulse. The phenomenon is PMD.

With reference to FIGS. 1A to 1D, a phenomenon will be described in which the PMD causes the distortion of the temporal waveform of optical pulses propagating over an optical fiber. In an optical communications system 10, FIG. 1A, a transmitter 12 and a receiver 14 as basic constituent elements are interconnected by an optical fiber transmission line 16 composed of an optical fiber, and an optical signal 18 propagates over the optical fiber transmission line 16 from the transmitter 12 to the receiver 14.

Figure 1A:
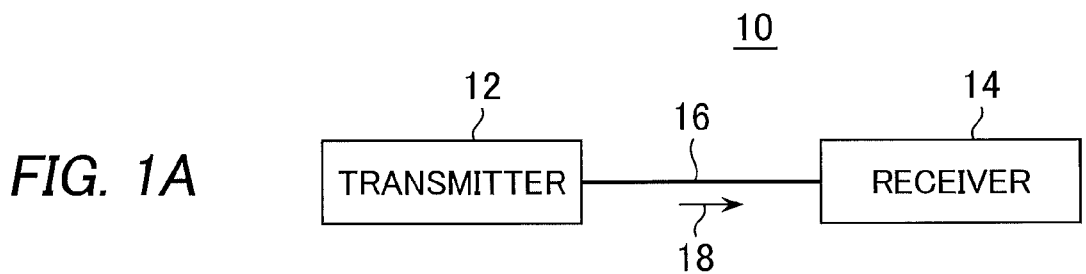
FIG. 1A is a schematic block diagram showing an optical communications system including a transmitter and a receiver connected to each other by a transmission line implemented by an optical fiber having a birefringent property.
Figure 1B:
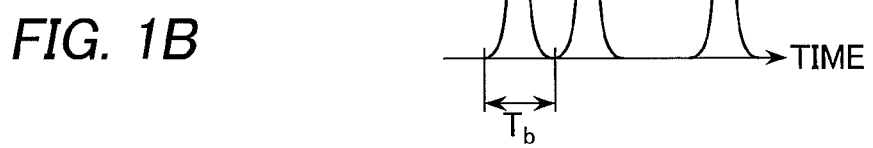
FIG. 1B shows the temporal waveform of an optical signal outputted from the transmitter shown in FIG. 1A.
Figure 1C:
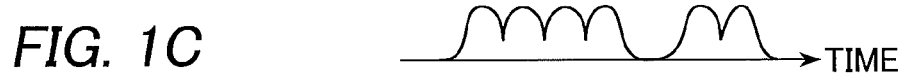
FIG. 1C shows the temporal waveform of an optical signal received in the receiver shown in FIG. 1A.

The transmitter 12 outputs the optical signal 18 to the optical fiber transmission line 16 in the form of optical pulses, as shown in FIG. 1B, having a waveform corresponding to digital, or binary, data "1" or "0" changeable with time. The receiver 14 receives the optical signal 18, as shown in FIG. 1C, over the optical fiber transmission line 16. In FIGS. 1B and 1C, the abscissa is the time axis, and the ordinate represents the signal intensity in an arbitrary scale although the ordinate line is not shown actually here.

Figure 1D:
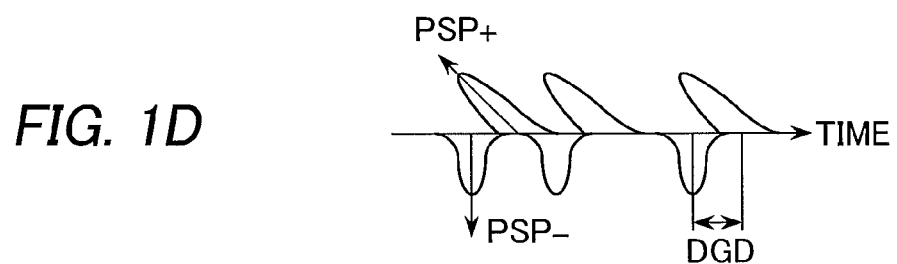
FIG. 1D perceptively shows on the time axis two mutually orthogonal polarization components contained in the waveform of the optical signal temporally varying and propagating over the optical fiber transmission line shown in FIG. 1A.

The optical signal 18 propagating over the optical fiber transmission line 16 between the transmitter 12 and the receiver 14 contains a couple of mutually orthogonal polarization components, as shown in FIG. 1D, and is represented by the temporal waveforms of the polarization components at the respective positions along the time axis. In FIG. 1D, the abscissa is also the time axis, and the optical intensity corresponding to the orthogonal directions of a PSP+ axis and a PSP− axis is perceptively shown for the respective axes. The PSP+ axis is the fast axis, and the PSP− axis is the slow axis. The PSP+ axis and the PSP− axis are coordinates defining the PSP representing the directions of polarization modes.

The optical signal 18 immediately after outputted from the transmitter 12 is of optical pulses not having time distortion, as shown in FIG. 1B. For a binary digital optical signal " . . . , 1, 1, 0, 1, . . . ", a time slot per bit extends over a width Tb. The optical signal 18 received by the receiver 14 has its waveform broken and distorted, as shown in FIG. 1C.

The optical pulses carrying the optical signal 18 before propagating over the optical fiber transmission line 16, i.e. immediately after outputted from the transmitter 12, are constituted by the polarization components in the directions of the PSP+ axis and the PSP− axis. The polarization components at this time have the same peak positions as the optical pulses on the time axis. However, the optical pulses may be, when propagating over the optical fiber transmission line 16 by a finite length, subject to different group speeds of the polarization components in the directions of the PSP+ axis and the PSP− axis due to the birefringent property of the optical fiber transmission line 16. That renders the optical pulses such that the peak positions are different from each other between the polarization components in the directions of the PSP+ and PSP−axes, as shown in FIG. 1D. The difference between the peak positions on the time axis is DGD.

The optical signal 18 is converted into a corresponding electric signal in the form of intensity signal by, for example, a photoelectric converter in the receiver 14. Therefore, the resultant, converted received signal takes temporal waveforms similar to those of the optical intensity obtained by adding the polarization components in the directions of the PSP+ axis and the PSP− axis of the optical pulses carrying the optical signal 18.

Hence, if the polarization components in the directions of the PSP+ axis and the PSP− axis of the optical pulses carrying the optical signal 18 have the same peak positions on the time axis, then the temporal waveform is a unimodal pulse not distorted, as shown in FIG. 1B. In contrast, if the polarization components in the directions of the PSP+ axis and the PSP− axis of the optical pulse carrying the optical signal 18 have the different peak positions on the time axis due to a DGD, the temporal waveform is a distorted multimodal pulse, as shown in FIG. 1G.

It is known as an empirical rule that if a DGD value reaches 30% of the width of a time slot allocated to one bit of an optical signal, i.e. a bit period Tb, a bit error rate or transmission quality given as, for example, the Q factor of a received signal drastically deteriorates. For example, the inventor of the patent application has confirmed that if Tb is equal to 6.25 ps and DGD reaches 1.8 ps, then the Q factor of a received signal drastically decreases. In other words, a higher transmission speed leads to a shorter bit period, and accordingly increases the influence of PMD on transmission quality.

As described above, it can be considered that the optical fiber may virtually be configured by plural short lengths of optical fiber in the optical waveguide direction, and that the PMD vector of each short length of optical fiber is different randomly.

Figure 2A:
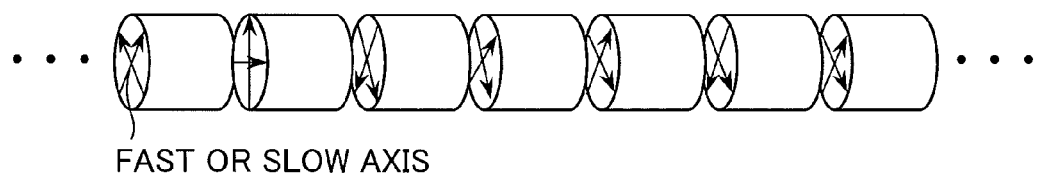
FIG. 2A schematically shows the fast or slow axes of PMD vectors caused by birefringence and oriented over plural short lengths of optical fiber, which are virtually considered as interconnected in series to each other to form the entire length of optical fiber.
Figure 2B:
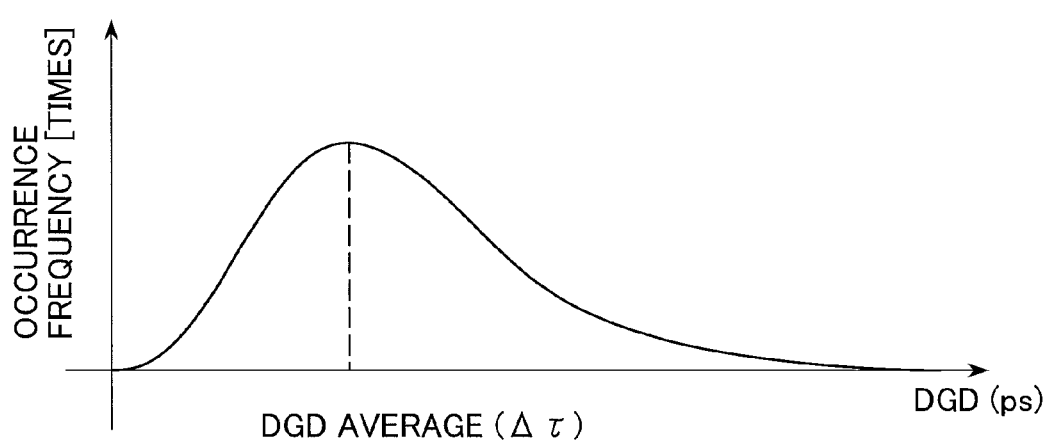
FIG. 2B is a graph plotting the distribution of occurrence frequency with respect to DGD values of the entire optical fiber transmission line when the state of polarization between the birefringent crystals varies randomly with time on the optical fiber transmission line having a distributed birefringent property.

Now, optical fibers considered to have PMD vectors varying randomly are shown in FIG. 2A. The distribution of DGD values along the lengths of optical fiber is plotted in FIG. 2B. The relationship giving that distribution will be described. In FIG. 2B, the abscissa represents DGD values in units of picosecond (ps), and the ordinate represents occurrences, or occurrence frequency, of the DGD values.

As seen from FIG. 2B, the distribution of DGD values giving the magnitude of PMD vectors of the respective short lengths of optical fiber is represented as Maxwell distribution. In FIG. 2B, Δτ represents the average value of DGDs of the optical fiber transmission line 16.

Figure 3:
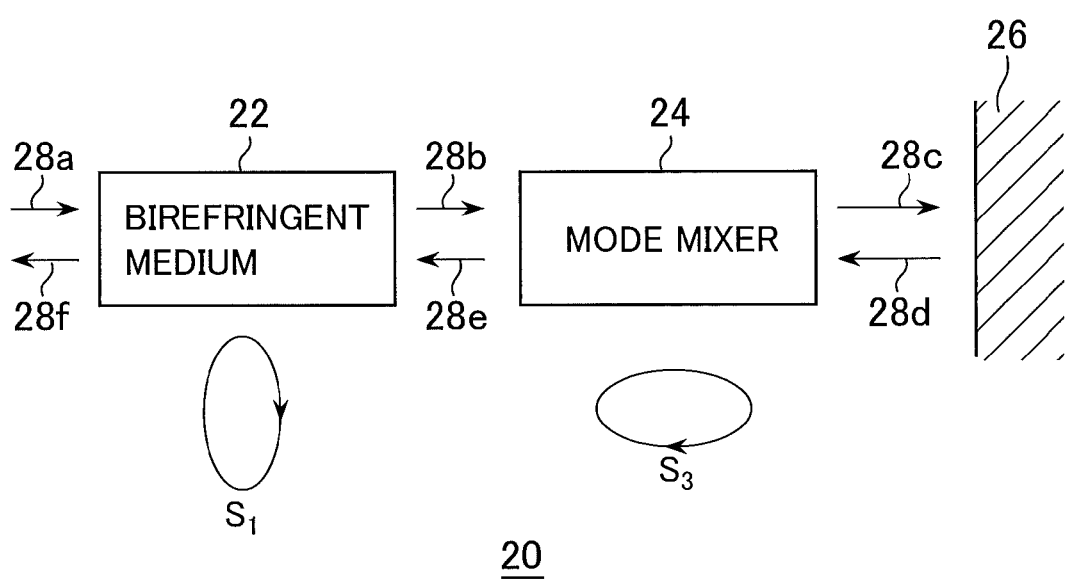
FIG. 3 is a schematic block diagram showing a configuration of a conventional PMD-generating apparatus including a birefringent medium, a mode mixer, and a reflective mirror.

Next, with reference to FIG. 3, a variable DGD generator 20 and its operations disclosed in Ikeda described earlier will briefly be described. The variable DGD generator 20 includes a birefringent medium 22, a mode mixer 24, and a reflective mirror 26, and is adapted to generate PMD by reciprocal propagation of an optical pulse over an optical path defined by the birefringent medium 22 and the mode mixer 24.

When an input optical pulse 28a is inputted to the birefringent medium 22, it will have different propagation speeds of the polarization components in the respective directions of the fast axis and the slow axis of the birefringent medium 22. That renders the input optical pulse 28a take its state of polarization (SOP) rotated in Stokes space about one axis, for example, an $S_1$-axis, of the three orthogonal axes defining the Stokes space, is outputted in the form of optical pulse 28b, and is thence inputted to the mode mixer 24. Also in the mode mixer 24, the optical pulse 28b has its SOP rotated about an axis, for example, an $S_3$-axis, orthogonal to a rotational axis in the birefringent medium 22, and is in turn outputted in the form of optical pulse 28c. The optical pulse 28c is reflected by the reflective mirror 26 and is inputted in the form of optical pulse 28d to the mode mixer 24 again.

The optical pulse 28d inputted to the mode mixer 24 has its SOP rotated about the $S_3$-axis and is outputted in the form of optical pulse 28e. The optical pulse 28e is inputted to the birefringent medium 22 to have its SOP rotated about the $S_1$-axis, and is outputted in the form of output optical pulse 28f. The output optical pulse 28f is a PMD-including optical pulse generated by adding a DGD to the input optical pulse 28a.

When the variable DGD generator 20 shown in FIG. 3 generates PMD vectors, it also generates the second-order PMD in connection with generation of the first-order PMD as described above, and outputs a PMD-including optical pulse including also the second-order PMD. Therefore, when the variable DGD generator 20 shown in FIG. 3 equalizes the PMD of an input optical pulse, it causes the second-order PMD to produce correspondingly to the equalizing operation. In other words, the first-order PMD is eliminated, but the second-order PMD is thus newly, i.e. unintentionally, raised, which was problematic.

Now, with reference to FIG. 4, a PMD-generating apparatus 30 and its operations disclosed in Phua et al., will be described. The PMD-generating apparatus 30 uses four birefringent media connected across variable phase shifters to variably generate DGD while reducing the generation of higher-order PMD.

Figure 4:
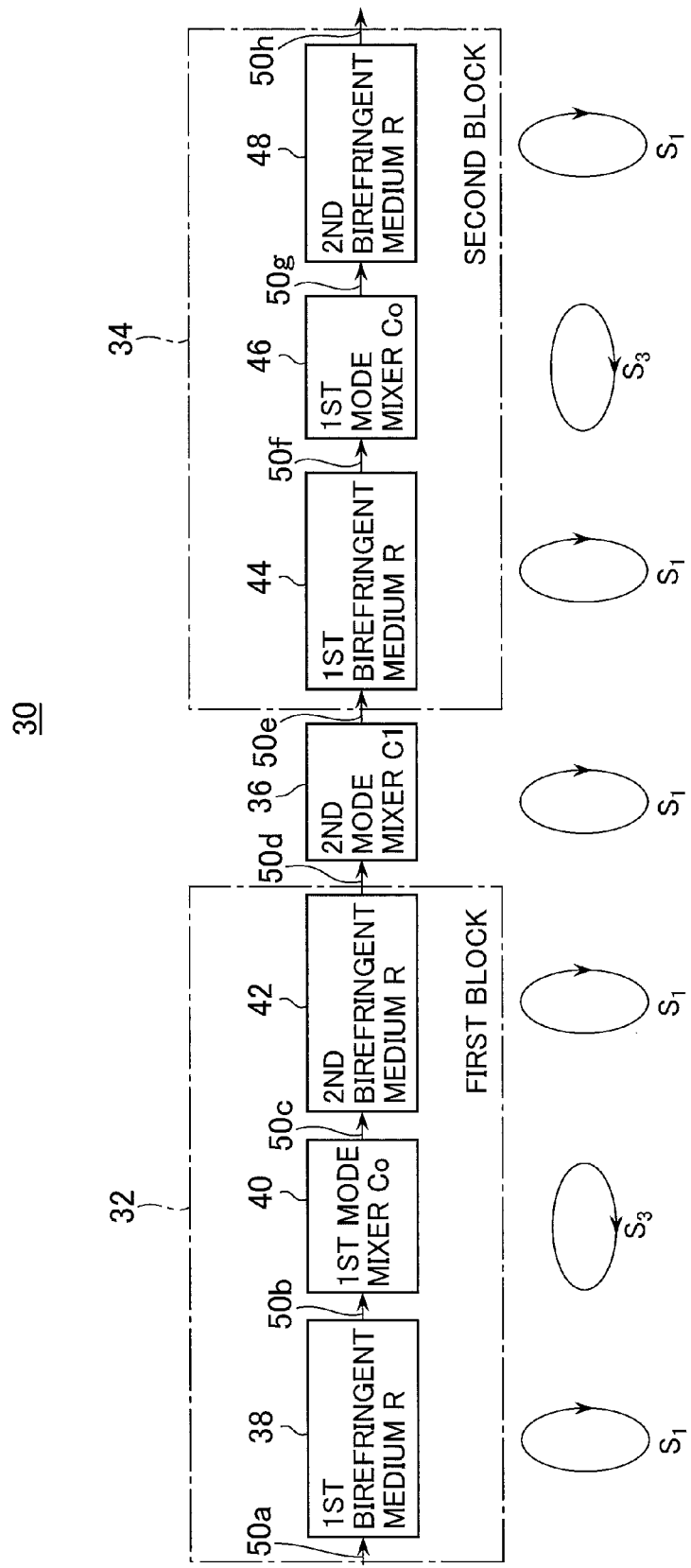
FIG. 4 is a schematic block diagram showing a configuration of a conventional PMD-generating apparatus for using four birefringent media connected across variable phase shifters to variably generate a DGD with higher-order PMD reduced from being generated in a DGD generator itself.

The PMD-generating apparatus 30 shown in FIG. 4 includes a first block 32 and a second block 34 having identical constituent elements to each other, and a second mode mixer 36. The second mode mixer 36 is connected between the first and second blocks 32 and 34. The first block 32 includes a first birefringent medium 38, a first mode mixer 40, and a second birefringent medium 42. The second block 34 includes a first birefringent medium 44, a first mode mixer 46, and a second birefringent medium 48. Hereinafter, the first and second blocks 32 and 34 may be referred to as unit function blocks.

In order to clarify the relationship between the reference symbols of FIG. 4 of the accompanying drawings and FIG. 1 of Phua et al., in the PMD-generating apparatus 30 shown in FIG. 4, the first birefringent media 38 and 44, the second birefringent media 42 and 48, the first mode mixers 40 and 46, the second mode mixer 36 are designated with letters R, Co, and C1, respectively, following thereto.

When an input optical pulse 50a is inputted to the first birefringent medium 38 of the first block 32, a difference in propagation speed between the polarization components in the respective directions of the fast and slow axes of the first birefringent medium 38 causes the SOP of the pulse to be rotated about one axis, for example, an $S_1$-axis, of three orthogonal axes defining the Stokes space. Then, the input optical pulse 50a is outputted in the form of optical pulse 50b to the first mode mixer 40. The optical pulse 50b has its SOP rotated by the first mode mixer 40 about an axis, e.g. an $S_3$-axis, orthogonal to an SOP rotational axis caused in the first birefringent medium 38, and is outputted in the form of optical pulse 50c to the second birefringent medium 42. The optical pulse 50c has its SOP rotated about the $S_1$-axis and is outputted in the form of optical pulse 50d to the second mode mixer 36.

The optical pulse 50d has its SOP rotated about the $S_1$-axis to be outputted in the form of optical pulse 50e, and is in turn inputted to the first birefringent medium 44 of the second block 34. The optical pulse 50e has its SOP rotated about the $S_1$-axis in the first birefringent medium 44 and is outputted in the form of optical pulse 50f to the first mode mixer 46. The optical pulse 50f has its SOP rotated about the $S_3$-axis in the first mode mixer 46 and is outputted in the form of optical pulse 50g to the second birefringent medium 48. The inputted optical pulse 50g has its SOP rotated about the $S_1$-axis in the second birefringent medium 48 and is outputted in the form of output optical pulse 50h. The output optical pulse 50h is a PMD-including optical pulse generated by adding a DGD to the input optical pulse 50a.

When the PMD-generating apparatus 30 shown in FIG. 4 generates PMD vectors, it causes the second block 34 to cancel the second-order PMD generated in the first block 32 if the first and second blocks 32 and 34 if the unit function blocks have the identical constituent elements as described above. In other words, if the first mode mixer 40 of the first block 32 and the first mode mixer 46 of the second block 34 can be controlled so as to each generate the same magnitude of a DGD, then the PMD-generating apparatus 30 allows the second block 34 to cancel the second-order PMD generated in the first block 32.

<PMD-Generating Apparatus>

A configuration and operations of the PMD-generating apparatus in accordance with the embodiment of the present invention will be briefly described with reference to FIG. 5.

The PMD-generating apparatus 60 includes the DGD generator 62, the mode mixer 64, the DGD generator 66, the mode mixer 68, and the reflective mirror 70, which are disposed in this order on a substrate, not shown. The DGD generators 62 and 66 each include a DGD adjustment mechanism for variably adjusting a DGD amount between orthogonal eigen-polarization modes generated in the DGD generators 62 and 66.

The DGD generators 62 and 66, as shown in FIG. 5, are configured in the form of Mach-Zehnder interferometer. In the stage preceding the DGD generator 62, a polarization plane controller (PPC) 74 is disposed which is adapted to variably adjust the SOP of an input signal 72 inputted to the DGD generator 62.

An input optical signal 76 from the polarization plane controller 74 is inputted to the DGD generator 62 and propagates back and forth on an optical path from the DGD generator 62 through the mode mixer 64, the DGD generator 66, and the mode mixer 68 to the reflective mirror 70. That causes the first-order PMD to be added to the input signal light, and the second-order PMD that was raised together with generation of the first-order PMD to be canceled. As a result, a PMD-added optical signal 78 is generated and outputted from the polarization plane controller 74 to an optical circulator 80.

It is to be noted that the unit function block 82 includes the DGD generator 62, the mode mixer 64, and the DGD generator 66.

The DGD generator 62 has a function to variably adjust a DGD amount between orthogonal eigen-polarization modes of incident light. In order to implement the function, the DGD generator 62 includes polarization beam splitters 84 and 90 and reflective mirrors 86 and 88. The polarization plane controller 74 outputs an optical signal 76 to the polarization beam splitter 84. The output light 76 is separated into a couple of orthogonal polarization components. One of the separated components is reflected by the reflective mirrors 86 and 88 in this order and is transmitted to the polarization beam splitter 90. The other polarization beam splitter 90 combines the one separated component with the other polarization component split by the one polarization beam splitter 84.

More specifically, one of the polarization components in the polarization beam splitter 84 propagates on an optical path through reflection by the reflective mirrors 86 and 88, and is supplied to the polarization beam splitter 90. The other polarization component propagates over a direct optical path from the polarization beam splitter 84 to the polarization beam splitter 90. The DGD generator 62 is thus adapted to variably adjust a DGD amount between orthogonal eigen-polarization modes having polarization components orthogonal to each other in the polarization beam splitter 84. The mechanism for implementing this function may be referred to as a first DGD adjustment mechanism.

The DGD generator 66 similarly has a function to variably adjust a DGD amount between orthogonal eigen-polarization modes of incident light. The DGD generator 66 includes a polarization beam splitter 92, a reflective mirror 94, a reflective mirror 96, and a polarization beam splitter 98. The DGD generator 66 may have the same constituent elements and functions as the DGD generator 62. Specifically, the DGD generator 66 includes a second DGD adjustment mechanism configured by the polarization beam splitters 92 and 98 and the reflective mirrors 94 and 96. Thus, the DGD adjustment mechanism has a function to variably adjust a DGD amount between orthogonal eigen-polarization modes of incident light.

The first and second DGD adjustment mechanisms may be fabricated integrally with a driven stage 100. Upon driving the driven stage 100, the same DGD can be generated through both mechanisms.

When the input signal light 72 is inputted through the optical circulator 80 to the PMD-generating apparatus 60, the first-order PMD is added thereto and the second-order PMD caused along with generation of the first-order PMD is canceled, generating and outputting the PMD-added optical signal 78.

The relationship of the corresponding constituent elements between the PMD-generating apparatus disclosed in Phua et al., and the PMD-generating apparatus 60 in accordance with the embodiment of the invention will be described.

In a case where the PMD-generating apparatus 60 is adapted to pass the input signal light 72 over an optical path from the unit function block 82 through the mode mixer 68 to the reflective mirror 70, and vice versa, the first and second blocks 32 and 34 including the identical constituent elements in the PMD-generating apparatus disclosed in Phua et al., and shown in FIG. 4 correspond to the unit function block 82. Additionally, the mode mixer 68 corresponds to the second mode mixer 36 shown in FIG. 4.

The polarization plane controller 74 is disposed in the stage preceding the DGD generator 62. Therefore, when the direction of the coordinate axis defining the PSP of the polarization mode of the input signal light 72 varies, the polarization can be converted into an arbitrary SOP to thereby enable control on an SOP to be inputted to the DGD generator 62.

More specifically, the PMD-generating apparatus 60 based on a reflective system uses reciprocal propagation of input signal light 72 through the single unit function block 82, thereby allowing operations of the unit function block 82 equivalent to propagation of input signal light through the two identical unit function blocks. Therefore, the operations can solve problems that the respective unit function blocks were required to have the same optical properties and that four birefringent media and two polarization plane rotators in total were required to be controlled so as to equalize optical properties thereof.

Meanwhile, an applicable wavelength band is determined at the time of operating the system. Therefore, the response capability therefor is not required to be as high-speed as the generation of PMD. Thus, an applicable wavelength band determined by a DGD amount generated by the birefringent medium can be determined by using a variable DGD mechanism having no wavelength-dependency in combination.

When the PMD-generating apparatus 60 is used as a PMD-compensating apparatus, the polarization plane controller 74 may be used for the purpose of equalizing the slow axis of the PMD-generating apparatus 60 to the fast axis of an optical signal influenced by PMD of the transmission line. The polarization plane controller 74 can adaptively adjust the SOP, even varying, of the input signal light 72. When the PMD-generating apparatus 60 is used as a PMD-emulating apparatus, the polarization plane controller 74 can be used for the purpose of varying the ratio of distributing power between the fast and slow axes of the PMD-generating apparatus 60.

When using the PMD-generating apparatus 60, a DGD value to be generated in the DGD generators 62 and 66 is set such as to match with a free spectral range (FSR) determined by the wavelength band of the input signal light 72 to be inputted (execution of FSR-setting step). The FSR-setting step is performed by adjusting DGDs generated in the DGD generators 62 and 66 at the same time. To obtain the sufficient spectrum flatness in the wavelength band of the input signal light 72, from experience of the inventor of the patent application, a DGD value is preferably set so as to ensure approximately three times as high as the FSR.

When the polarization plane controller 74 receives the input signal light 72, it converts the polarization of the input signal light 72 to output the resultant optical signal 76 to the DGD generator 62. Due to a difference of propagation distances between the polarization components in the respective directions of the fast and slow axes in the DGD generator 62, the input signal light 72 has its SOP rotated about one axis, for example, an $S_1$-axis, of the three orthogonal axes defining the Stokes space to be outputted in the form of optical signal 102, which is in turn inputted to the mode mixer 64.

The optical signal 102 has its SOP rotated by the mode mixer 64 about an axis, for example, an $S_3$-axis, orthogonal to a rotational axis in the DGD generator 62, and is outputted in the form of optical signal 104 to the DGD generator 66. The optical signal 104 has its SOP rotated about the $S_1$-axis and is outputted in the form of optical signal 106 to the mode mixer 68.

The optical signal 106 inputted to the mode mixer 68 has its SOP rotated about the $S_1$-axis and is outputted in the form of optical signal 108 to the reflective mirror 70. The optical signal 108 is reflected by the reflective mirror 70 and is inputted in the form of optical signal 110 to the mode mixer 68 again. The optical signal 110 has its SOP rotated by the mode mixer 68 about the $S_1$-axis and is outputted in the form of optical signal 112 to the DGD generator 66.

The optical signal 112 has its SOP rotated by the DGD generator 66 about the $S_1$-axis and is outputted in the form of optical signal 114 to the mode mixer 64. The optical signal 114 has its SOP rotated by the mode mixer 64 about the $S_3$-axis and is outputted in the form of optical signal 116 to the DGD generator 62. The optical signal 116 has its SOP rotated by the DGD generator 62 about the $S_1$-axis and is outputted in the form of optical signal 118 to the polarization plane controller 74. The optical signal 118 is outputted in the form of optical signal 78 from the polarization plane controller 74 to the optical circulator 80. The optical signal 78 is outputted in the form of PMD-added optical signal.

As described so far, the PMD-generating apparatus 60 uses reciprocal propagation of an input signal through the unit function block 82, thereby accomplishing operations equivalent to propagation of an input signal through the two identical unit function blocks. Since the PMD-generating apparatus 60 includes the single unit function block 82, it can be simplified in its entire configuration and readily control the generation of PMD. Furthermore, the PMD-generating apparatus 60 can set an FSR and can therefore generate PMD independent of the occupied wavelength band of the input signal light 72.

The first and second DGD adjustment mechanisms integrally installed with the driven stage 100 can each generate the substantially equal DGD by driving the driven stage 100. Thus, the PMD-generating apparatus 60 can set an FSR with simpler operations. In other words, the FSR-setting step may be performed by adjusting DGDs generated in the DGD generators 62 and 66 at the same time.

The mode mixers 64 and 66 each have a function to effectively reduce the generation of the second-order PMD. The mode mixer 64 includes a first ¼-wavelength plate, a first phase shifter, and a second ¼-wavelength plate, which are disposed in this order in the direction from the DGD generator 62 to the DGD generator 66. The mode mixer 68 includes a second phase shifter.

To effectively reduce the generation of the second-order PMD, the second-order PMD vector giving the second-order PMD generated on a forth or onward path is preferably to be equal in magnitude and opposite in direction to the second-order PMD vector generated on a return or backward path. In other words, the rotative direction of an SOP on the onward path is preferably in consistent with the rotative direction of an SOP on the backward path. Thus, in the mode mixer 64, the first ¼-wavelength plate, the first phase shifter and the second ¼-wavelength plate are disposed to thereby accomplish symmetric conversion of polarization between the onward and backward paths. The mode mixer 64 can accomplish the second-order PMD vector giving the second-order PMD generated on the onward path to be equal in magnitude and opposite in direction to the second-order PMD vector giving the second-order PMD generated on the backward path.

The first phase shifter can operate at a high speed by applying a polarization plane rotator composed of optically transmissive ceramic responsive to a change in refraction indexes between orthogonal polarization components based on the Kerr effect. Furthermore, the polarization plane controller 74 and the first and second phase shifters can be implemented by the same device to thereby simplify the implementation.

<PMD-Compensating Apparatus>

Now, a configuration and operations of a PMD-compensating apparatus 120 in accordance with the present invention will be briefly described with reference to FIG. 6.

The PMD-compensating apparatus 120 includes a polarization analyzer 122, a calculator 124 and a driver 126 in addition to the PMD-generating apparatus 60. The PMD-compensating apparatus 120 is adapted to receive input signal light 72 to generate equalization PMD for equalizing PMD of the input signal light 72, and add the equalization PMD to the optical signal to produce and output a PMD-compensated optical signal 78.

Figure 6:
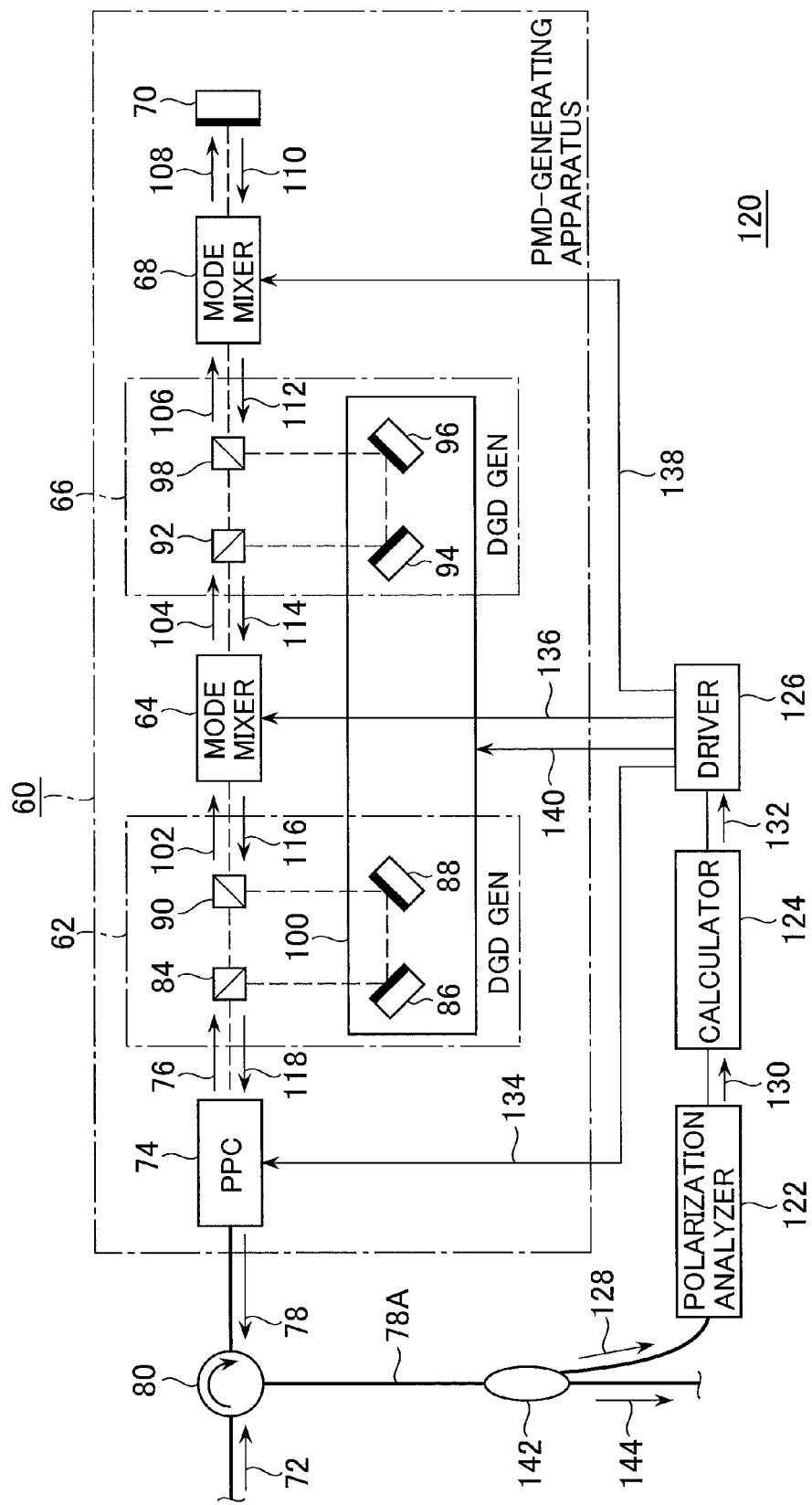
FIG. 6 is a schematic block diagram showing a configuration of a PMD-compensating apparatus in accordance with the embodiment of the present invention.
Figure 7:
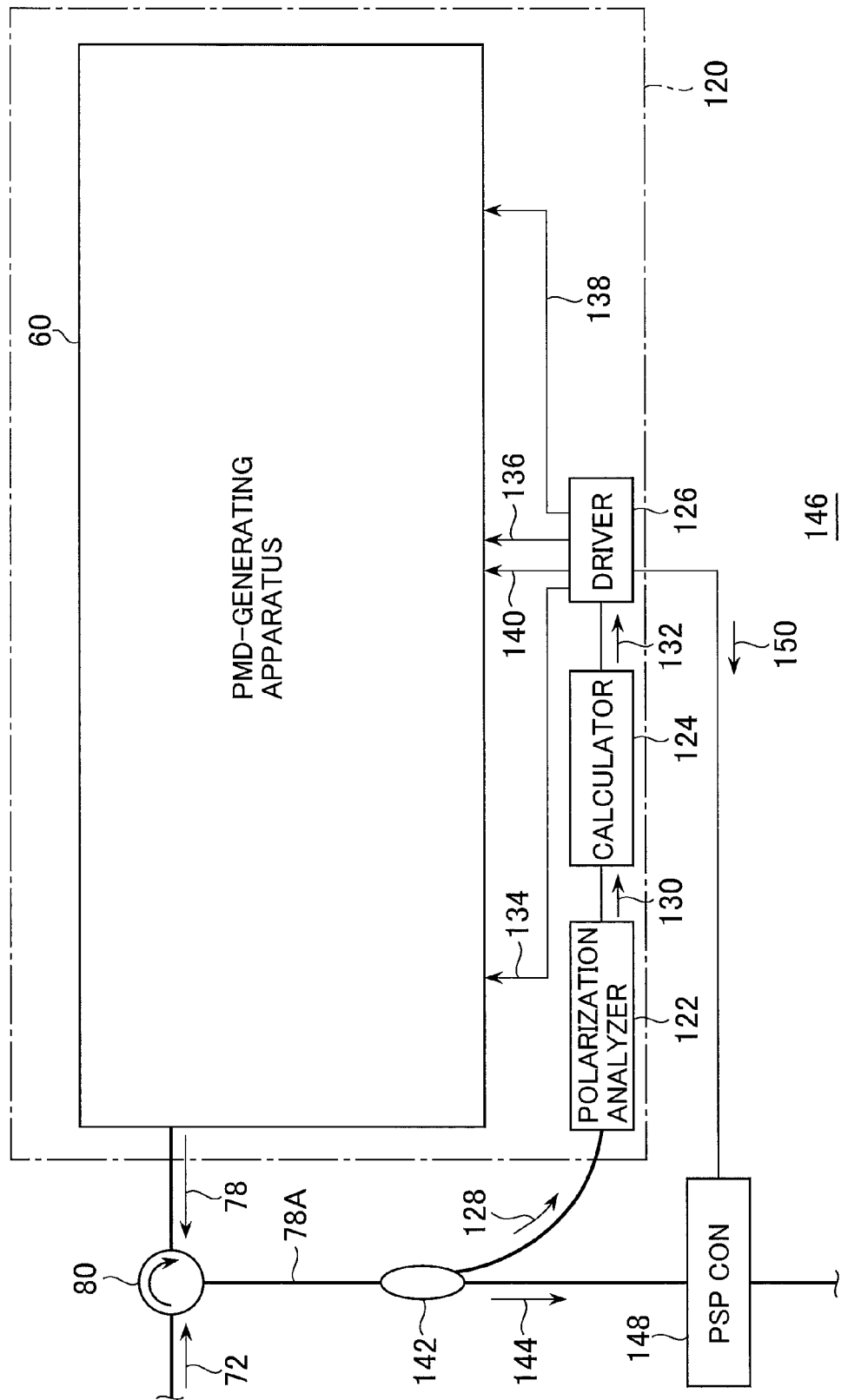
FIG. 7 is a schematic block diagram showing a configuration of a PMD-emulating apparatus in accordance with the embodiment of the present invention.

Meanwhile, the PMD-generating apparatus 60 of the preceding illustrative embodiment shown in and described with reference to FIGS. 5, 6 and 7 is used for a PMD-generating apparatus for use in the PMD-compensating apparatus of the embodiment. Therefore, repetitive descriptions on the configuration and operations of the PMD-generating apparatus 60 will be refrained from.

The polarization analyzer 122 has a function to receive an optical signal 128 in the form of incident light to be tentatively compensated for PMD, and to digitize the degree of PMD of the incident light 128 as PMD-compensating parameters 130. The polarization analyzer 122 may have a known configuration using a DOP (Degree of Polarization) meter, and a computation processor, not shown. To the DOP meter, applicable is, for example, a DOP meter, Model POD-101A, manufactured by General Photonics Corporation, U.S.A. The DOP meter is used for the polarization analyzer 122 to obtain the PMD-compensating parameters 130 including Stokes parameters, supplying the resultant parameters through a USB interface to the calculation processor or the calculator 124. The computation processor or calculator 124 can be implemented by using, for example, a personal computer having program sequences stored for calculating, when running on the computer, a DOP from the PMD-compensating parameters 130. In other words, the personal computer may be used to calculate a DOP from the PMD-compensating parameters 130. In the embodiment, the polarization analyzer 122 supplies the digitized PMD-compensating parameters 130 to the calculator 124.

The calculator 124 has a function to calculate DOP from the PMD-compensating parameters 130 and to produce a PMD-compensating instruction signal 132 for generating equalization PMD so as to decrease the magnitude of PMD of a tentative PMD-compensated optical signal 128. Algorithm for producing the PMD-compensating instruction signal 132 in the calculator 124 is performed by properly using optimization algorithm such as known hill-climbing algorithm and PSO (Particle Swarm Optimization) algorithm. The optimization algorithm may be performed manually.

For a fast temporal change in the SOP of the input signal light 72, the calculator 124 is preferably operated properly automatically on, for example, a general-purpose computer having software stored for calculating the PMD-compensating instruction signal 132 for generating equalization PMD so as to decrease the magnitude of PMD of a tentative PMD-compensated optical signal 128.

The driver 126 has a function to control the polarization plane controller 74, the mode mixers 64 and 68, and the driven stage 100 in response to the calculated PMD-compensating instruction signal 132. The driver 126 supplies control signals 134, 136, 138, and 140 to the polarization plane controller 74, the mode mixers 64 and 68, and the driven stage 100, respectively.

In practice, the PMD-compensating apparatus 120 also includes an optical splitter 142 in addition to the optical circulator 80, as shown in FIG. 6.

Now, operations of the PMD-compensating apparatus 120 will be described. The input signal light 72 is inputted through the optical circulator 80 to the PMD-generating apparatus 60. The PMD-generating apparatus 60 adds the first-order PMD (equalization PMD) to the input signal light, and cancels the second-order PMD involved in generation of the first-order PMD to produce a resultant PMD-added optical signal 78 to output the PMD-added optical signal 78 to the optical circulator 80.

The PMD-added optical signal 78 is supplied through the optical circulator 80 to the optical splitter 142. The optical splitter 142 splits the supplied PMD-added optical signal 78A into two signals. One of the split optical signals is inputted as the tentative PMD-compensated optical signal 128 to the polarization analyzer 122. The other 144 of the signals split by the optical splitter 142 will be a tentative PMD-compensated optical signal when the magnitude of its PMD is controlled to be substantially equal to zero. In practice, it is difficult in a strict sense for the magnitudes of the tentative PMD-compensated optical signals 128 and 142 to be rendered equal to zero. Therefore, the PMD-compensated optical signal may, when the magnitude of PMD decreases to a predetermined value or less, be dealt with as generated.

When the polarization analyzer 122 receives the tentative PMD-compensated optical signal 128, it outputs the PMD-compensating parameters 130 to the calculator 124.

The PMD-compensating parameters 130 can be set by using the DOP (Degree of Polarization) of the tentative PMD-compensated optical signal 128. The DOP is a value defined as a ratio of the optical intensity of a polarization component to the entire optical intensity of an optical pulse. Therefore, using Stokes parameters ($S_0$, $S_1$, $S_2$, $S_3$), a DOP is given by an expression (3):

$$DOP = \frac{(S_1^2 + S_2^2 + S_3^2)^{1/2}}{S_0}. \tag{3}$$

If the Stokes parameters ($S_0$, $S_1$, $S_2$, $S_3$) is found, a DOP is calculated by the expression (3).

The DOP takes a larger value for small PMD and a smaller value for large PMD. Therefore, control may be made on the DOP so as to take a larger value. A control manner for increasing a DOP is known as will be described later.

The method for monitoring a DOP to compensate for PMD can be characteristically performed without depending upon the transmission bit rate of an optical signal having waveform distortion to be compensated for, and can also be applied to an optical signal in any RZ (Return to Zero) format.

Well, as described above, a personal computer that contains a program for calculating a DOP, may be used. This is useful since applicable to a PMD-generating step, a polarization-analyzing step, a calculating step, and an equalization PMD control step in a PMD-compensating method in accordance with an embodiment described below.

For example, those steps can be performed and controlled in principle by manual operations of the driver 126. In that case, an operator may know a DOP value outputted from the polarization analyzer 122, and determine from that value whether to increase or decrease the DOP value to operate the driver 126 so as to control the PMD-generating apparatus 60. As a matter of course, those steps can properly be performed automatically on, for example, a general-purpose computer as described above.

A PMD-compensating method performed by the PMD-compensating apparatus 120 may include a step of generating PMD by the PMD-generating apparatus 60, a step of analyzing the polarization of an optical signal by the polarization analyzer 122, a calculating step of calculating an instruction signal by the calculator 124, and an equalization PMD control step of generating a control signal by the driver 126. The driven stage 100 is controlled by the control signal 140 to thereby perform a step of setting an FSR.

First, the PMD-generating step generates tentative equalization PMD, and adds the PMD to the input signal light 72 to produce a tentative PMD-compensated optical signal 78, i.e. a tentative PMD-compensated optical signal 78A. The polarization-analyzing step converts the magnitude of PMD of the tentative PMD-compensated optical signal 128 into a corresponding DOP as the PMD-compensating parameters 130, and outputs the DOP. The calculating step uses the DOP 130 outputted from the polarization analyzer 122 to calculate and output the PMD-compensating instruction signal 132 for generating equalization PMD so as to decrease the magnitude of PMD of the tentative PMD-compensated optical signal 128. The equalization PMD control step uses the PMD-compensating instruction signal 132, and monitors the DOP value of the tentative PMD-compensated optical signal 128 to control the PMD-generating apparatus 60 to output the PMD-compensated optical signal 78.

More specifically, the polarization analyzer 122 obtains a DOP as the PMD-compensating parameters corresponding to the degree of PMD of the tentative PMD-compensated optical signal 128, and outputs the PMD-compensating parameters 130. The PMD-compensating instruction signal 132 is generated by using the DOP indicated by the PMD-compensating parameters 130 so that the equalization PMD is generated so as to decrease the magnitude of PMD of the tentative PMD-compensated optical signal 128. The control signals 134, 136, 138, and 140 are generated on the basis of the PMD-compensating instruction signal 132 by the driver 126 to control the polarization plane controller 74, the mode mixers 64 and 68 and the driven stage 100, respectively, to adjust the states thereof. This varies the DOP of the tentative PMD-compensated optical signal 128. The varied DOP 130 is measured by the polarization analyzer 122 to then perform the above control again, thus constituting a feedback control system.

<PMD-Emulating Apparatus>

Now, a configuration and operations of a PMD-emulating apparatus 146 in accordance with the present invention will be briefly described with reference to FIG. 7.

The PMD-emulating apparatus 146 includes, as shown in FIG. 7, a principal-state-of-polarization (PSP) controller 148 in addition to the PMD-compensating apparatus 120. The PMD-compensating apparatus 120 includes, in addition to the PMD-generating apparatus 60, the polarization analyzer 122, the calculator 124 and the driver 126 shown in FIG. 6. The PMD-emulating apparatus 146 has a function to receive input signal light 72 not including PMD, and generate an emulation PMD-including optical signal 78 obtained by adding a predetermined magnitude of PMD to adjust the PSP of an emulation PMD-including optical signal 78A to a predetermined PSP value to output the resultant optical signal.

It is to be noted that the PMD-compensating apparatus 120 of the PMD-emulating apparatus 146 includes the PMD-generating apparatus 60 of the preceding embodiment. Therefore, repetitive descriptions on the configuration and operations of the PMD-generating apparatus 60 will be avoided.

The PMD-compensating apparatus 120 in the PMD-emulating apparatus 146 may include the same constituent elements as those shown in FIG. 6, which are therefore designated with the same reference numerals, and repetitive descriptions thereon will be avoided. Additionally, like signals and components are designated with the same reference numerals.

The PMD-generating apparatus 60 in the PMD-compensating apparatus 120 is adapted to generate PMD in order to equalize PMD included in input signal light. In contrast, the PMD-generating apparatus 60 in the PMD-emulating apparatus 146 is adapted to generate PMD in order to intentionally add PMD to input signal light 72 including no PMD. In both the PMD-compensating apparatus 120 and the PMD-emulating apparatus 146, the PMD-generating apparatus 60 similarly generates PMD, and like signals are therefore designated with the same reference numerals.

Input signal light 72 not including PMD is inputted through the optical circulator 80 to the PMD-generating apparatus 60. Then, the first-order PMD is added to the input signal light with the second-order PMD canceled which is raised in connection with the first-order PMD generated. Thus, the PMD-added optical signal 78 is generated and outputted from the PMD-generating apparatus 60.

The PMD-added optical signal 78 outputted from the PMD-generating apparatus 60 is inputted as the PMD-added optical signal 78A through the optical circulator 80 to the optical splitter 142. The optical splitter 142 splits the PMD-added optical signal 78A into two signals. One of the optical signals is inputted as the tentative PMD-including optical signal 128 to the polarization analyzer 122.

The tentative PMD-including optical signal 144 as the other signal split by the optical splitter 142 changes to an emulation PMD-including optical signal when it is controlled to have its PSP substantially equal to a predetermined PSP value, i.e. to have its PMD substantially equal to a PMD value having its magnitude representing a predetermined PSP value. In practice, it is difficult in a strict sense for the magnitude of the tentative PMD-including optical signal 144 or 128 to be rendered substantially equal to PMD having its magnitude representing the predetermined PSP value. Therefore, when a difference in magnitude between the PMD of the tentative PMD-including optical signal 128 and the predetermined PMD value is substantially equal to or less than a predetermined value, the emulation PMD-including optical signal is considered to be generated.

When the polarization analyzer 122 receives the tentative PMD-including optical signal 128, it digitizes and outputs the magnitude of PMD of the tentative PMD-including optical signal 128 as PMD parameters 130. The PMD parameters 130 can be set by using the DOP of the tentative PMD-including optical signal 128. The DOP has a larger value for smaller PMD and a smaller value for larger PMD. Therefore, to obtain smaller PMD, the DOP may be controlled so as to have a larger value. The control manner for increasing a DOP is similar to that for the PMD-compensating apparatus of the preceding embodiment. Therefore, repetitive descriptions thereon will be refrained from.

The calculator 124 calculates a DOP on the basis of the PMD parameters 130 and outputs a PMD-adding instruction signal 132 so as to approximate the magnitude of the tentative PMD-including optical signal 128 to the magnitude of the predetermined PMD value.

The driver 126 supplies control signals 134, 136, 138, and 140 to the polarization plane controller 74, the mode mixers 64 and 68, and the driven stage 100, respectively, in the PMD-generating apparatus 60.

The PSP controller 148 has a function to adjust the PSP of the tentative PMD-including optical signal 144 to a predetermined PSP value on the basis of a control signal 150 outputted from the driver 126. The PSP controller 148 outputs an optical signal 144 having the predetermined PSP value in response to the control signal 150.

The PMD-emulating method performed by the PMD-emulating apparatus 146 may include a PMD-generating step performed by the PMD-generating apparatus 60, a polarization-analyzing step performed by the polarization analyzer 122, a calculating step performed by the calculator 124, a emulation PMD control step performed by the driver 126, and a PSP control step performed by the PSP controller 148. The driven stage 100 is controlled by the control signal 140 to thereby perform an FSR-setting step.

The polarization plane controller 74 performs a polarization-adjusting step. The polarization-adjusting step equalizes the SOP of the polarization component passing the fast axis of the transmission line to the slow axis of the PMD-generating apparatus, and adjusts the ratio of distributing power between the fast and slow axes of the PMD-generating apparatus.

The PMD-generating step generates tentative equalization PMD, and adds the PMD to the input signal light 72 to generate a tentative PMD-including optical signal 78 or 78A, i.e. a tentative PMD-including optical signal 128. The polarization-analyzing step converts the magnitude of PMD of the tentative PMD-including optical signal 128 into a corresponding DOP 130 as the PMD parameters, and outputs the DOP. The calculating step uses the DOP 130 outputted from the polarization analyzer 122 to calculate and output a PMD-adding instruction signal 132 so as to approximate the magnitude of PMD of the tentative PMD-including optical signal 128 to the magnitude of the predetermined PMD. The emulation PMD control step uses the PMD-adding instruction signal 132 to control the PMD value of a PMD-including optical signal 128 to output an emulation PMD-including optical signal 144.

The polarization analyzer 122 obtains the DOP of the PMD-added optical signal 78, i.e. the tentative PMD-added optical signal 128 to output the DOP as the PMD parameters 130 to the calculator 124. The calculator 124 performs the calculating step of generating, on the basis of the DOP indicated by the PMD parameters 130, the PMD-adding instruction signal 132 for generating an equalization PMD so as to approximate the PMD to the predetermined PMD value, and outputting the PMD-adding instruction signal 132 to the driver 126. The PSP control step is performed by the PSP controller 148 to adjust the tentative PMD-including optical signal 128 to the predetermined PSP value to output the resultant signal.

The driver 126 generates the control signals 134, 136, 138, and 140 on the basis of the PMD-adding instruction signal 132, and supplies the control signals 134, 136, and 138 to the polarization plane controller 74 and the mode mixers 64 and 68, respectively, to adjust the states of the polarization plane controller 74 and the mode mixers 64 and 68. This varies the DOP of the tentative PMD-added optical signal 128. Thus, the varied DOP is measured by the polarization analyzer 122, the control described above being repeated. In the PMD-emulating apparatus 146, the measurement and control repeated in this way forms a feedback control loop.

<PMD-Generating Apparatus in Alternative Embodiment>

Now, a configuration and operations of a PMD-generating apparatus 120 in accordance with an alternative embodiment of the present invention will be briefly described with reference to FIG. 8. In the instant alternative embodiment, like components and elements are designated with the same reference numerals as the preceding embodiment.

Figure 8:
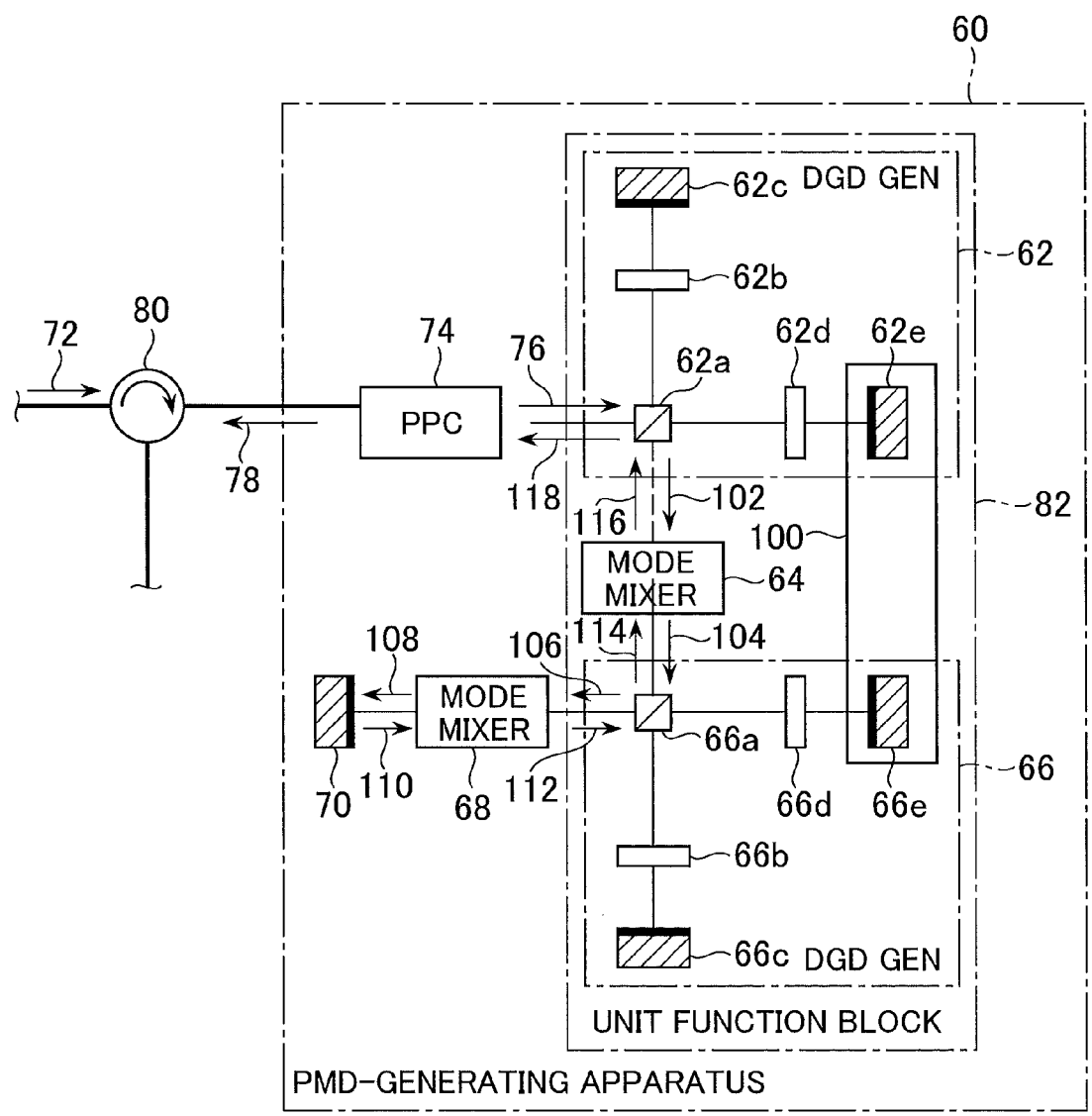
FIG. 8 is a schematic block diagram, like FIG. 5, showing a configuration of a PMD-generating apparatus in accordance with an alternative embodiment of the present invention.

The PMD-generating apparatus 60 shown in FIG. 8 includes the DGD generators 62 and 66, the mode mixers 64 and 68, and the reflective mirror 70 similarly to that shown in FIG. 5. The DGD generators 62 and 66 each include a DGD adjustment mechanism for variably adjusting a DGD amount between orthogonal eigen-polarization modes generated in the DGD generators 62 and 66.

In the stage preceding the DGD generator 62, the polarization plane controller 74 is disposed similarly to the preceding embodiment. The polarization plane controller 74 has a function to arbitrarily adjust the SOP of an input signal inputted to the DGD generator 62.

The unit function block 82 includes the DGD generator 62, the mode mixer 64, and the DGD generator 66.

The DGD generator 62 includes a polarization beam splitter 62a, ¼-wavelength plates 62b and 62d, and reflective mirrors 62c and 62e in a form of Michelson interferometer. The reflective mirror 62e is disposed on the driven stage 100. The DGD generator 62 can vary an optical path length to thereby generate a DGD on the basis of the wavelength of input signal light. The DGD generator 62 has a function to variably adjust the DGD amount between the orthogonal eigen-polarization modes by using the reflective mirror 62e. The mechanism for implementing this function may be referred to as a first DGD adjustment mechanism.

The DGD generator 66 similarly includes a polarization beam splitter 66a, ¼-wavelength plates 66b and 66d, and reflective mirrors 66c and 66e. The reflective mirror 66e is disposed on the driven stage 100. The DGD generator 66 can vary an optical path length to thereby generate a DGD on the basis of the wavelength of input signal light.

The polarization beam splitter 66a and the reflective mirrors 66c and 66e may have the same functions as the polarization beam splitter 62a and the reflective mirrors 62c and 62e, respectively, in the DGD generator 62. Thus, the DGD generator 66 has a function to variably adjust the DGD amount between the orthogonal eigen-polarization modes' by using the reflective mirror 66e. The mechanism for implementing this function may be referred to as a second DGD adjustment mechanism.

The first and second DGD adjustment mechanisms may integrally be fabricated with the driven stage 100. The PMD-generating apparatus 60 of this embodiment allows both mechanisms to each generate the substantially equal DGD by driving the driven stage 100.

The input signal light 72, similarly to the PMD-generating apparatus 60 of the preceding embodiment, is inputted through the optical circulator 80 to the PMD-generating apparatus 60 of this alternative embodiment. The PMD-generating apparatus 60 of the alternative embodiment adds the first-order PMD to the input signal light 72, and cancels the second-order PMD caused in connection with generation of the first-order PMD to produce the PMD-added optical signal.

The relationship of the corresponding constituent elements between the PMD-generating apparatus disclosed in Phua. et al., and the PMD-generating apparatus 60 of the present alternative embodiment will read as follows.

In the PMD-generating apparatus 60 of the instant alternative embodiment also, the input signal light 72 propagates back and forth on an optical path from the unit function block 82 through the mode mixer 68 to the reflective mirror 70. The PMD-generating apparatus 30 shown in FIG. 4 includes the identical first and second blocks 60 and 70. The identical blocks correspond to the unit function block 82 in the PMD-generating apparatus 60 of the present alternative embodiment, and the second mode mixer 36 shown in FIG. 4 corresponds to the mode mixer 68.

The input signal light 72 is inputted through the optical circulator 80 to the polarization plane controller 74. The polarization plane controller 74 converts the polarization of the input signal light 72 to input the resultant optical signal 76 to the DGD generator 62. When the optical signal 76 is inputted to the DGD generator 62, a difference in propagation distance between the polarization components in the respective directions of the fast and slow axes of the input signal light 72 in the DGD generator 62 causes the SOP of the input signal light to rotate about one axis, for example, an $S_1$-axis, of the three orthogonal axes defining the Stokes space. The DGD generator 62 outputs the resultant optical signal 102 to the mode mixer 64.

The optical signal 102 similarly has its SOP rotated by the mode mixer 64 about an axis, for example, an $S_3$-axis, orthogonal to a rotational axis in the DGD generator 62, and is outputted in the form of optical signal 104 to the DGD generator 66. The optical signal 104 has its SOP rotated about the $S_1$-axis and is outputted in the form of optical signal 106 to the mode mixer 68.

The inputted optical signal 106 has its SOP rotated by the mode mixer 68 about the $S_1$-axis and is outputted in the form of optical signal 108 to the reflective mirror 70. The optical signal 108 is reflected by the reflective mirror 70 and is inputted in the form of optical signal 110 to the mode mixer 68 again. The optical signal 110 has its SOP rotated by the mode mixer 68 about the $S_1$-axis and is outputted in the form of optical signal 112 to the DGD generator 66.

The optical signal 112 has its SOP rotated by the DGD generator 66 about the $S_1$-axis and is outputted in the form of optical signal 114 to the mode mixer 64. The optical signal 114 has its SOP rotated by the mode mixer 64 about the $S_3$-axis and is outputted in the form of optical signal 116 to the DGD generator 62. The optical signal 116 has its SOP rotated by the DGD generator 62 about the $S_1$-axis and is outputted in the form of optical signal 118 to the polarization plane controller 74. The polarization plane controller 74 outputs a PMD-added optical signal 78 through the optical circulator 80.

As described above, the PMD-generating apparatus 60 uses reciprocal propagation of an input signal through the DGD generator 62, the mode mixer 64, and the DGD generator 66 in the unit function block 82, thereby accomplishing operations equivalent to propagation of an input signal through the two identical unit function blocks.

Furthermore, the PMD-generating apparatus 60 can perform the FSR-setting step and hence generate PMD independent of the occupied wavelength band of the input signal light 72.

The first and second DGD adjustment mechanisms may integrally be fabricated with the driven stage 100. Both mechanisms can each generate the substantially equal DGD by driving the driven stage 100. Thus, an FSR can be selected with simpler operations. Specifically, the FSR-setting step may be performed by adjusting DGDs generated in the DGD generators 62 and 66 at the same time. Therefore, the first and second DGD adjustment mechanisms may preferably be installed in integral with the driven stage 100.

The DGD generator 62 of the current alternative embodiment is configured in a form of Michelson interferometer, unlike the DGD generator 62 of the preceding embodiment using the Mach-Zehnder interferometer. In the DGD generator 62 of the alternative embodiment, as shown in FIG. 8, the ¼-wavelength plate 62d is disposed between the polarization beam splitter 62a and the reflective mirrors 62e. The optical signal 102 has a DGD added and is outputted downward in FIG. 8. For example, an optical signal 76 is outputted from the polarization plane controller 74 and is inputted to the polarization beam splitter 62a. Light transmitted from the polarization beam splitter 62a is delayed over an optical path returning from reflection by the reflective mirror 62e. Light reflected by the polarization beam splitter 62a is not delayed even over an optical path returning to the polarization beam splitter 62a from reflection by the reflective mirror 62c.

The polarization beam splitter 62a combines an optical signal delayed with an optical signal not delayed to output the resultant optical signal 102 to the mode mixer 64.

The DGD generator 66 also includes the similar constituent elements to those of the DGD generator 62. In one of the polarization beam splitter 62a of the DGD generator 62 and the polarization beam splitter 66a of the DGD generator 66, a P-polarized optical signal component is set so as to be split in the direction corresponding to that of an S-polarized optical signal component split in the other. More specifically, if the polarization beam splitter 62a is set so as to split a P-polarized optical signal component in the direction (fast axis) toward the reflective mirror 62c, a polarization component reflected by the reflective mirror 62c is S-polarized by reciprocal propagation through the ¼-wavelength plate 62b. Therefore, the polarization beam splitter 66a is set so as to split an S-polarized component in the direction toward the reflective mirror 66c. Conversely, if the polarization beam splitter 62a is set so as to split an S-polarized optical signal component in the direction (fast axis) toward the reflective mirror 62c, in the polarization beam splitter 62a, a polarization component reflected by the reflective mirror 62c is P-polarized by reciprocal propagation through the ¼-wavelength plate 62b. Therefore, the polarization beam splitter 66a is set so as to split a P-polarized component in the direction toward the reflective mirror 66c.

The first and second DGD adjustment mechanisms, i.e. DGD generators 62 and 66, respectively, are each configured in a form of Michelson interferometer. This provides an advantageous effect that the apparatus is readily downsized without forming it in an elongate shape. Additionally, misalignment may advantageously be minimized which would otherwise be caused by errors in fabrication or deterioration with age.

The mode mixer 64 includes the first ¼-wavelength plate, the first phase shifter, and the second ¼-wavelength plate, which are disposed in this order in the direction from the optical circulator 80 to the DGD generator 62. Additionally, the mode mixer 68 includes the second phase shifter. That configuration makes it possible to generate the second-order PMD effectively, as is the case with the PMD-generating apparatus 60 of the preceding illustrative embodiment.

<PMD-Compensating Apparatus>

Now, a configuration and operations of a PMD-compensating apparatus 120 in accordance with the alternative embodiment will be briefly described with reference to FIG. 9.

Figure 9:
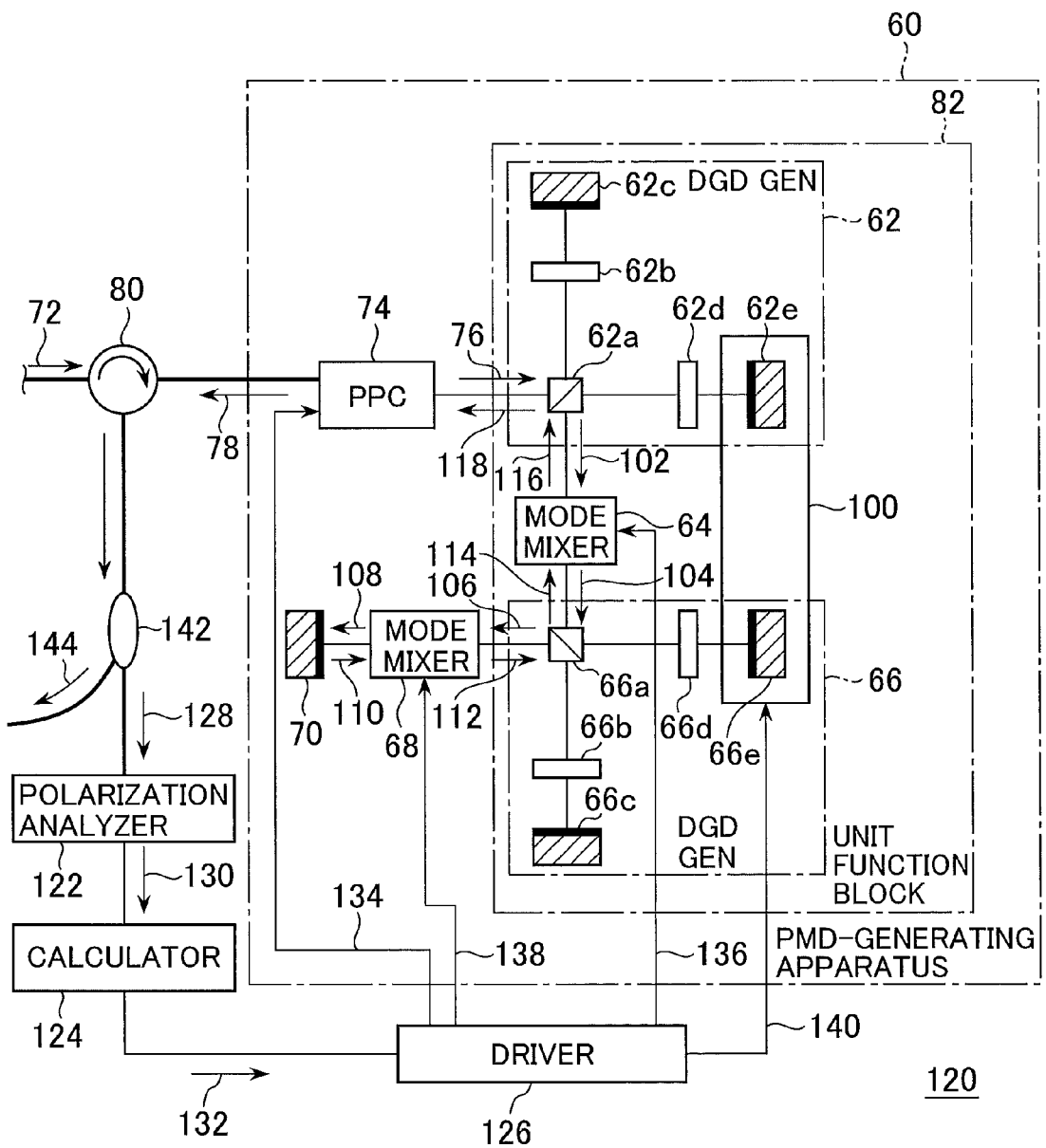
FIG. 9 is a schematic block diagram, like FIG. 6, showing a configuration of a PMD-compensating apparatus in accordance with the alternative embodiment of the present invention.

The PMD-compensating apparatus 120 of the instant alternative embodiment includes, as shown in FIG. 9, the PMD-generating apparatus 60, the polarization analyzer 122, the calculator 124, and the driver 126. The PMD-compensating apparatus 120 is adapted, similarly to the preceding embodiment, to receive input signal light 72 to generate equalization PMD for equalizing PMD of the input signal light 72, and add the equalization PMD to the optical signal to produce a PMD-compensated optical signal 78.

However, the PMD-compensating apparatus 120 of the alternative embodiment includes the PMD-generating apparatus 60 shown in FIG. 8. Therefore, repetitive descriptions on the operations of the PMD-generating apparatus 60 will be avoided.

The driver 126 supplies, as shown in FIG. 9, control signals 134, 136, 138, and 140 to the polarization plane controller 74, the mode mixers 64 and 68, and the driven stage 100, respectively, for control thereon. The polarization analyzer 122, the calculator 124, and the driver 126 may include the same constituent elements and also may have the same functions as the corresponding constituent elements shown in FIG. 6.

The PMD-compensating method performed by the PMD-compensating apparatus 120 of the present alternative embodiment includes a PMD-generating step performed by the PMD-generating apparatus 60, a polarization-analyzing step performed by the polarization analyzer 122, a calculating step performed by the calculator 124, and an equalization PMD control step performed by the driver 126. Those steps may be the same as the preceding embodiment.

<PMD-Emulating Apparatus>

Now, a configuration and operations of a PMD-emulating apparatus 146 in accordance with the instant alternative embodiment will be briefly described with reference to FIG. 10.

Figure 10:
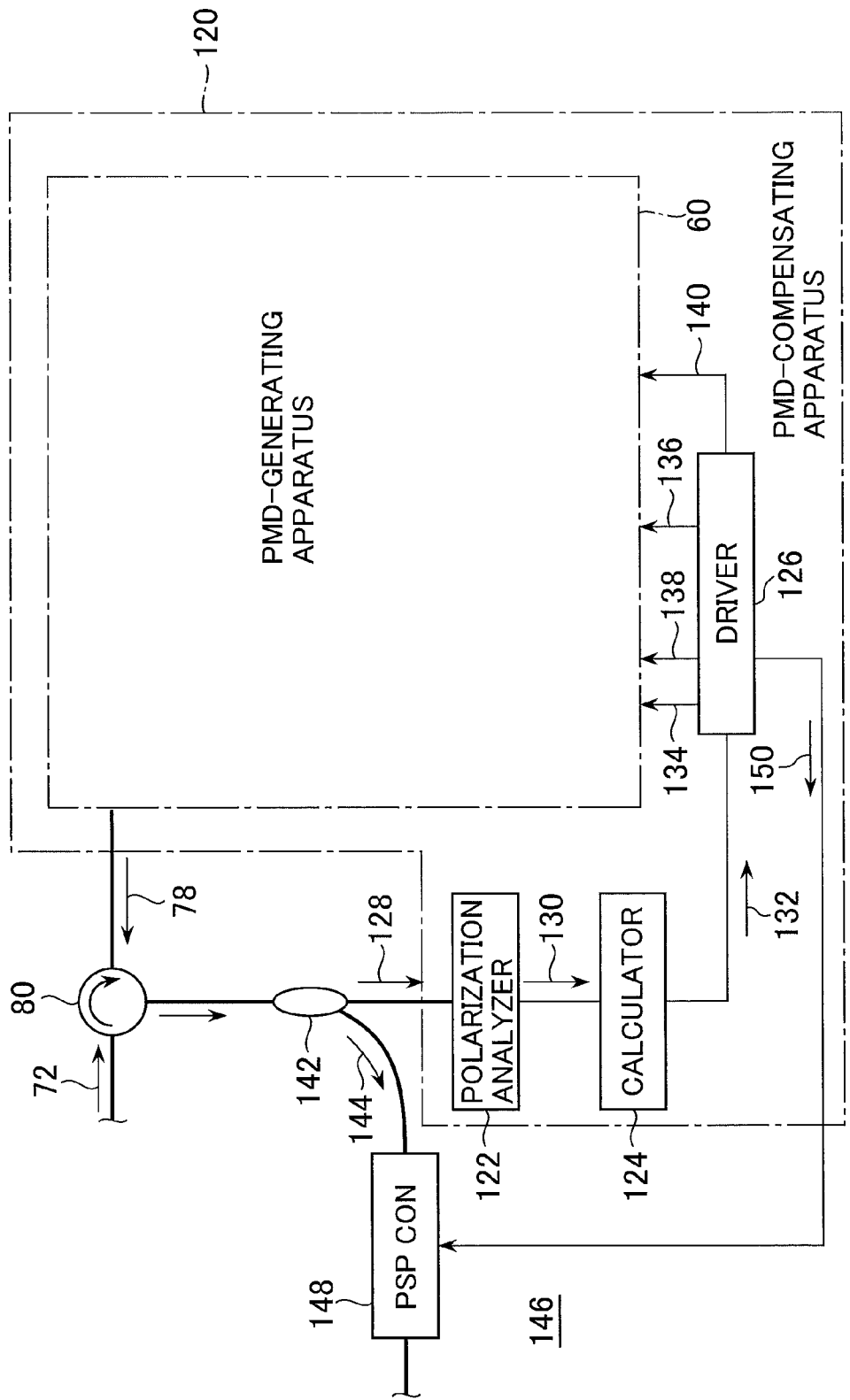
FIG. 10 is a schematic block diagram, like FIG. 7, showing a configuration of a PMD-emulating apparatus in accordance with the alternative embodiment of the present invention.

The PMD-emulating apparatus 146 of the alternative embodiment includes, as shown in FIG. 10, the PMD-compensating apparatus 120 and the PSP controller 148. The PMD-compensating apparatus 120 includes the PMD-generating apparatus 60, the polarization analyzer 122, the calculator 124, and the driver 126. The PMD-emulating apparatus 146 is adapted to receive input signal light 72 not including PMD to produce a PMD-including optical signal 78 including the predetermined magnitude of PMD added by emulation, and adjust the PSP of the PMD-including optical signal 78 to a predetermined PSP value to output the resultant optical signal.

However, the PMD-generating apparatus 60 shown in FIG. 10 is configured by the PMD-generating apparatus 60 shown in FIG. 8. Therefore, repetitive descriptions on the operations thereof will be refrained from.

The PMD-generating apparatus 60 in the PMD-compensating apparatus 120 generates PMD in order to equalize PMD included in input signal light. In contrast, the PMD-generating apparatus 60 in the PMD-emulating apparatus 146 generates PMD in order to intentionally add PMD to input signal light including no PMD.

Input signal light 72 not including PMD is inputted through the optical circulator 80 to the PMD-generating apparatus 60. Then, the first-order PMD is added to the input signal light with the second-order PMD canceled which was involved in generation of the first-order PMD. Thus, the PMD-added optical signal 78 is generated and outputted from the PMD-generating apparatus 60.

The PSP controller 148 adjusts the PSP of the tentative PMD-including optical signal 144 to a predetermined PSP value on the basis of a control signal 150 for the PSP controller 148 outputted from the driver 126, and outputs the adjusted signal.

The PMD-emulating method performed by the PMD-emulating apparatus 146 may include the same steps as the preceding embodiment. Therefore, repetitive descriptions on the steps will also be avoided.

<PMD-Generating Apparatus in Another Alternative Embodiment>

Now, a configuration and operations of a PMD-generating apparatus in accordance with another alternative embodiment of the present invention will be briefly described with reference to FIG. 11.

In the PMD-generating apparatus 60 of the other alternative embodiment, the first and second DGD adjustment mechanisms each include plural birefringent media disposed in series and composed of birefringent crystal generating different DGD amounts from one another. Between the birefringent media, 90-degree variable polarization rotators are disposed which rotate and switch by 90 degrees the electric-field components in the directions of the fast and slow axes of light propagating through the birefringent medium. The first and second DGD adjustment mechanisms are implemented by the DGD generators 62 and 66, respectively.

Figure 11:
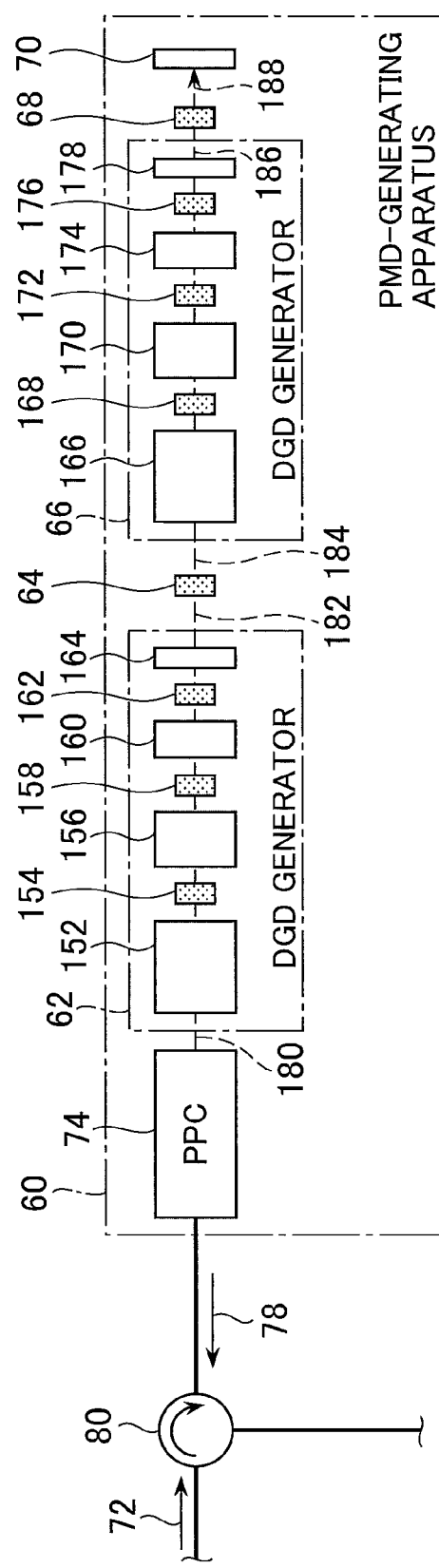
FIG. 11 is a schematic block diagram, like FIG. 5, showing a configuration of a PMD-generating apparatus in accordance with another alternative embodiment of the present invention.

In detail, as shown in FIG. 11, the PMD-generating apparatus 60 includes the polarization plane controller 74, the DGD generator 62, the mode mixer 64, the DGD generator 66, the mode mixer 68, and the reflective mirror 70, which are disposed in series in this order. The DGD generators 62 and 66 may each include the same constituent elements. The PMD-generating apparatus 60 may include the optical circulator 80.

In each of the DGD generators 62 and 66, the birefringent media generating different DGD amounts from one another are disposed so as to define the same optical axis, and the 90-degree variable polarization rotators are disposed between the birefringent media and switch the propagation axes of the fast and slow axes of the birefringent medium.

In the DGD generator 62, for example, as shown in FIG. 11, there are disposed a birefringent medium 152, a 90-degree variable polarization rotator 154, a birefringent medium 156, a 90-degree variable polarization rotator 158, a birefringent medium 160, a 90-degree variable polarization rotator 162, and a birefringent medium 164 in this order on a substrate, not shown. Similarly, in the DGD generator 66, there are disposed in the corresponding order a birefringent medium 166, a 90-degree variable polarization rotator 168, a birefringent medium 170, a 90-degree variable polarization rotator 172, a birefringent medium 174, a 90-degree variable polarization rotator 176, and a birefringent medium 178.

In an exemplified case where the DGD generator 62 includes as the first DGD adjustment mechanism the birefringent media 152, 156, 160, and 164 generating DGD amounts of 8, 6, 4, and 2 ps (picoseconds), respectively, a DGD of up to 20 ps can be generated.

In order to generate DGD not exceeding 20 ps, either one of the 90-degree variable polarization rotators 154, 158 and 162 may be set to have its polarization rotation amount to 90 degrees instead of 0 degrees to thereby produce discrete values. That is also the same with the DGD generator 66.

The input signal light 72 is inputted through the optical circulator 80 to the polarization plane controller 74 so as to control the polarization plane and to determine the direction of a PMD vector generated in the PMD-generating apparatus 60.

The number of the birefringent media in each of the DGD generators 62 and 66 is not restricted to such specific four described above, but may be any number more than one. An increase in number of the birefringent media included therein can increase kinds of settable DGD values.

The optical signal 180 outputted from the polarization plane controller 74 is inputted to the DGD generator 62. The DGD generator 62 is supplied, similarly to the DGD generator of the preceding embodiment, with a DGD that is set on the basis of the wavelength band of the input signal light 72. The optical signal 182 having a PMD vector added in the DGD generator 62 has its SOP rotated by the mode mixer 64 about the polarization rotational axis generated in the DGD generator 62 and an orthogonal axis in the Stokes space. The optical signal 184 having its polarization rotation added by the mode mixer 64 is inputted to the DGD generator 66.

Now, the DGD generator 62 is set so as to generate the same DGD value as the DGD generator 66. In the DGD generator 62, the mode mixer 64 and the DGD generator 66, a DGD is generated which is insensitive to variation in a wavelength determined by the polarization rotation amount of the mode mixer 64. The PMD vector has its direction rotated in response to a variation in the wavelength in the Stokes space. For example, if the DGD generator 62 is set so as to orient a PMD vector therein in the direction of the $S_1$-axis in Stokes space, the PMD vector rotates about the $S_1$-axis with respect to a variation in wavelength. The optical signal 186 outputted from the DGD generator 66 is inputted to the mode mixer 68.

The PMD vector of the optical signal 186 generated from the DGD generator 66 corresponds to a DGD determined by the mode mixer 64 generating a constant DGD independent of a wavelength, and the direction of a unit vector parallel to the PMD vector rotates with respect to the wavelength.

The polarization rotational axis in the mode mixer 68 is equal to, or in consistent with, the polarization rotational axis of an optical signal propagating through the DGD generator 62, and is orthogonal to the polarization rotational axis in the mode mixer 64. The mode mixer 68 determines, when combining a PMD vector on the onward path and a PMD vector on the backward path in the reflective structure, a combination point in Stokes space.

The optical signal 188 having its SOP rotated by the mode mixer 68 is reflected by the reflective mirror 70 and is inputted to the mode mixer 68, the DGD generator 66, the mode mixer 64, and the DGD generator 62 in this order. The DGD generator 62 generates a substantially equal DGD to a DGD generated by the DGD generator 66. Therefore, a PMD vector generated from the DGD generator 62 through the mode mixer 64 to the DGD generator 66 is in consistent with a PMD vector generated on the inverse transmission optical path from the DGD generator 66 through the mode mixer 64 to the DGD generator 62. Thus, the direction of the second-order PMD vector can be set to the direction of an inverse vector around a central wavelength determined by the mode mixer 68 to thereby generate only the first-order PMD in the central wavelength.

The optical signal 78 outputted on the backward path from the DGD generator 62 passes the polarization plane controller 74 again. However, a PMD vector in the polarization plane controller 74 is negligible, and hence does not influence the function for generating PMD. The optical signal 78 outputted on the backward path from the DGD generator 62 is outputted through the optical circulator 80.

<PMD-Compensating Apparatus in the Other Alternative Embodiment>

Figure 12:
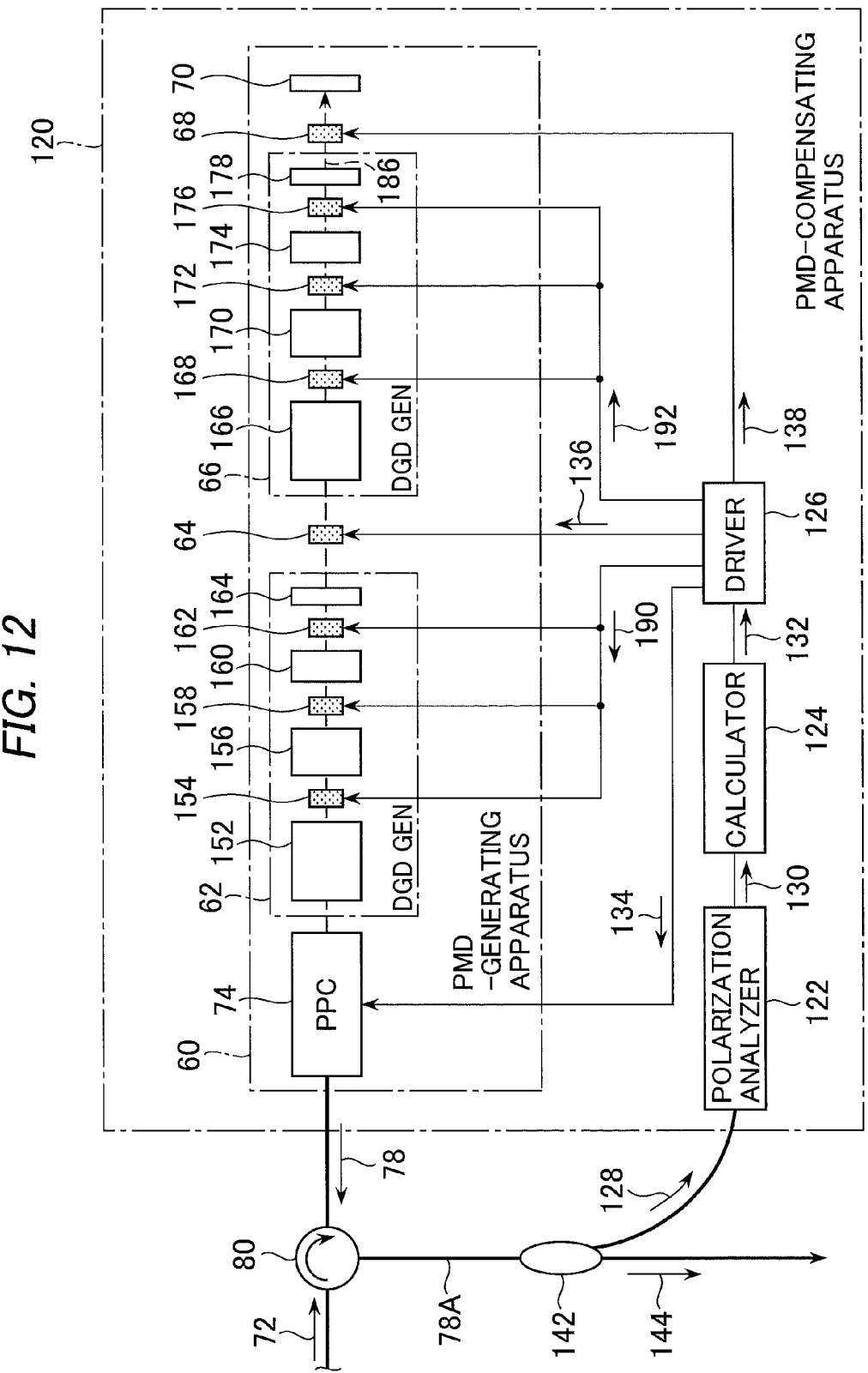
FIG. 12 is a schematic block diagram, like FIG. 6, showing a configuration of a PMD-compensating apparatus in accordance with the other alternative embodiment of the present invention.

Now, a configuration and operations of a PMD-compensating apparatus 120 in accordance with the other alternative embodiment of the present invention will be briefly described with reference to FIG. 12.

The PMD-compensating apparatus 120 of the current other alternative embodiment includes the PMD-generating apparatus 60, the polarization analyzer 122, the calculator 124, and the driver 126. In the PMD-compensating apparatus 120, the PMD-generating apparatus 60 is adapted to receive the input signal light 72 to generate equalization PMD for equalizing PMD of the input signal light 72, and add the equalization PMD to the optical signal to generate a PMD-compensated optical signal to output the resultant signal through the optical circulator 80.

However, the PMD-compensating apparatus 120 of the instant alternative embodiment includes the PMD-generating apparatus 60 shown in FIG. 11. Therefore, repetitive descriptions on the operations of the PMD-generating apparatus 60 will be avoided. For the PMD-compensating apparatus 120, like components and elements are designated with the same reference numerals as the preceding embodiments. Repetitive descriptions on the polarization analyzer 122, the calculator 124, and the driver 126 will be refrained from.

The driver 126 supplies control signals 134, 136, and 138 to the polarization plane controller 74, and the mode mixers 64 and 68, respectively. The driver 126 supplies control signals 190 and 192 to a group of 90-degree variable polarization rotators 154, 158 and 162, and a group of 90-degree variable polarization rotators 168, 172 and 176, respectively. The driver 126 may not be adapted to supply a control signal corresponding to the control signal 140 since the instant alternative embodiment does not include, unlike the two preceding embodiments, part corresponding to the driven stage 100 having some of the constituent elements of the DGD generator arranged.

Like signals in the PMD-compensating apparatus 120 are designated with the same reference numerals as the preceding embodiment. Repetitive descriptions on the tentative PMD-including optical signal 128, the tentative PMD-including optical signal 144, the PMD parameters 130, and the PMD-adding instruction signal 132 will thus be avoided.

The control signal 190 controls the polarization rotation amounts of the 90-degree variable polarization rotators 154, 158, and 162 to set the amounts to 0 or 90 degrees. The control signal 192 controls the polarization rotation amounts of the 90-degree variable polarization rotators 168, 172, and 176 to set the amounts to 0 or 90 degrees. The control signals 136 and 138 controls the mode mixers 64 and 68, respectively.

The PMD-compensating method performed by the PMD-compensating apparatus 120 may include a PMD-generating step performed by the PMD-generating apparatus 60, a polarization-analyzing step performed by the polarization analyzer 122, a calculating step performed by the calculator 124, and an equalization PMD control step performed by the driver 126. Those steps may also be the same as the preceding embodiments. Therefore, repetitive descriptions thereon will be avoided.

<PMD-Emulating Apparatus in the Other Alternative Embodiment>

Now, a configuration and operations of a PMD-emulating apparatus 146 in accordance with the other alternative embodiment of the present invention will be briefly described with reference to FIG. 13.

Figure 13:
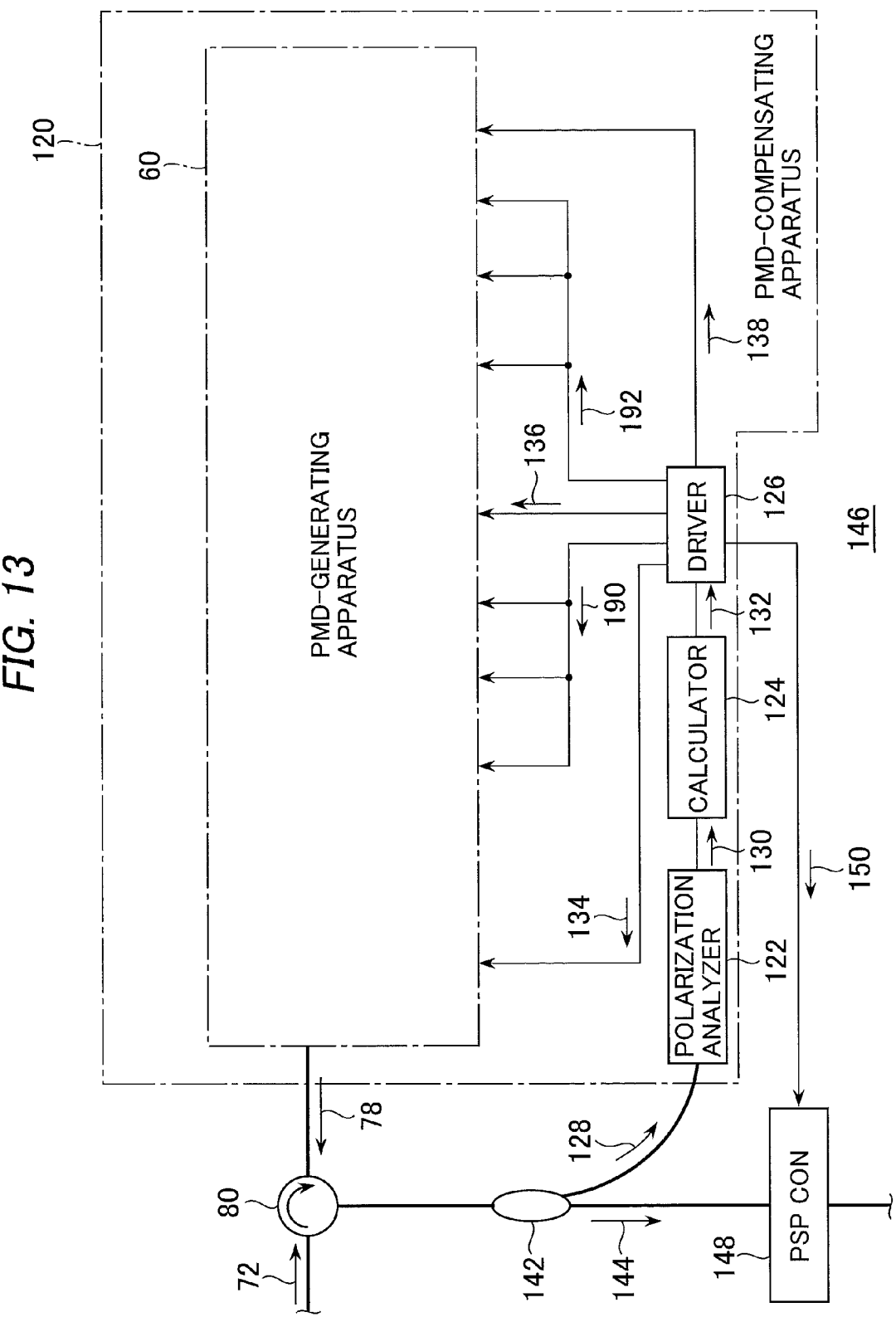
FIG. 13 is a schematic block diagram, like FIG. 7, showing a configuration of a PMD-emulating apparatus in accordance with the other alternative embodiment of the present invention.

The PMD-emulating apparatus 146 of the other alternative embodiment includes, as shown in FIG. 13, the PMD-compensating apparatus 120 and the PSP controller 148. The PMD-compensating apparatus 120 includes the PMD-generating apparatus 60, the polarization analyzer 122, the calculator 124, and the driver 126. The PMD-emulating apparatus 146 is adapted to receive input signal light 72 not including PMD to generate a PMD-including optical signal including the predetermined magnitude of PMD added by emulation, and adjust the PSP of the PMD-including optical signal to a predetermined PSP value to output the resultant optical signal.

However, the PMD-emulating apparatus 146 of the current alternative embodiment includes the PMD-generating apparatus 60 shown in FIG. 11. Therefore, repetitive descriptions thereon will also be refrained. For the PMD-compensating apparatus 120, like components and elements are designated with the same reference numerals as the preceding embodiments. Repetitive descriptions on the polarization analyzer 122, the calculator 124, and the driver 126 will be avoided.

The PMD-generating apparatus 60 in the PMD-compensating apparatus 120 generates PMD in order to equalize PMD included in input signal light 72 inputted to the PMD-generating apparatus 60. In contrast, the PMD-generating apparatus 60 in the PMD-emulating apparatus 146 generates PMD in order to intentionally add PMD to input signal light 72 not including PMD, the input signal light 72 being inputted to the PMD-generating apparatus 60. In both the PMD-compensating apparatus 120 and the PMD-emulating apparatus 146, the PMD-generating apparatus 60 similarly generates PMD. Therefore, the tentative PMD-including optical signal 128, the tentative PMD-including optical signal 144, the PMD parameters 130, and the PMD-adding instruction signal 132 shown in FIGS. 12 and 13 are designated with the same reference numerals.

The PSP controller 148 has a function to adjust the PSP of the tentative PMD-including optical signal 144 to a predetermined PSP value on the basis of a control signal 150 outputted from the driver 126. The PSP controller 148 can adjust the tentative PMD-including optical signal 144 to the predetermined PSP value to output the resultant optical signal.

Input signal light 72 free of PMD is inputted through the optical circulator 80 to the PMD-generating apparatus 60. Then, the first-order PMD is added to the input signal light 72 with the second-order PMD canceled which was caused along with generation of the first-order PMD. The PMD-added optical signal 78 is thus produced to be outputted from the PMD-generating apparatus 60.

The polarization analyzer 122, the calculator 124, the driver 126, and the PSP controller 148 may be the same as the PMD-emulating apparatus 146 shown in FIG. 7. The PSP controller 148 adjusts the PSP of the tentative PMD-including optical signal 144 to a predetermined PSP value on the basis of a control signal 150 outputted from the driver 126, and outputs the resultant optical signal.

The PMD-emulating method performed by the PMD-emulating apparatus 146 may include the same steps as the two preceding embodiments. Therefore, repetitive descriptions on the steps will also be avoided.

<Advantageous Effects Provided by Varying Applicable Wavelength Band>

In summary, in the PMD-generating apparatus 60 in accordance with those illustrative embodiments, an FSR is determined by DGD values generated in the DGD generators 62 and 66, and the central wavelength of the FSR can be arbitrarily shifted by the polarization rotation amount generated in the DGD generator 66. By matching the central wavelength with the central wavelength of a grid in WDM (Wavelength Division Multiplexing), the PMD-emulating apparatus can be used to collectively evaluate a WDM signal.

The present invention can characteristically vary an applicable wavelength band to thereby set an FSR arbitrarily. Advantageous effects attained by this function will be described below in detail.

The wavelength or frequency dependency of PMD may be caused by the wavelength or frequency dependency of a phase difference caused between orthogonal eigen-axes after an optical signal passes through a birefringent medium. For example, signal light is inputted to a birefringent medium to cause a phase difference $\phi$ between orthogonal eigen-axes. The value of $\phi$ is given by a relationship:

$$\phi = (2\pi/\lambda)\Delta n d$$

where d is the length of the birefringent medium, and $\Delta n$ is a refraction index difference between the orthogonal eigen-axes of the birefringent medium.

The following relationship is given where $\tau$ is a delay difference, i.e. a DGD value between the orthogonal eigen-axes caused by passing through the birefringent medium, and c is a light speed.

$$\Delta nd = c\tau$$

The phase difference φ [radian] is represented by a relationship:

$$\phi = 2\pi f\tau$$

where f is the frequency of an optical signal.

The phase difference φ between the orthogonal eigen-axes is generated not only by using the birefringent medium as described above but also by implementing the mechanism in a form of Mach-Zehnder or Michelson interferometer like the PMD-generating apparatuses 60 of the two preceding embodiments. In the former PMD-generating apparatus 60, the DGD generators 62 and 66 as the first and second DGD generation mechanisms do not include a birefringent medium. However, the following theory is based on common effects provided by a function generating the phase difference φ between the orthogonal eigen-axes. Therefore, the above description on generating the phase difference φ between the orthogonal eigen-axes by the birefringent medium is applied without modification. Thus, the following will be described as an example using the former PMD-generating apparatus 60.

The absolute value of two substantially equal PMD vectors generated in the DGD generators 62 and 66 of the PMD-generating apparatus 60 is set to τ. Additionally, the absolute value of the PMD vectors is assumed to be equal to a DGD value. In this case, as described above, an FSR is given by a relationship:

$$FSR = \frac{1}{2\tau}.$$

Therefore, the FSR is determined depending on the DGD value.

Figure 14A:
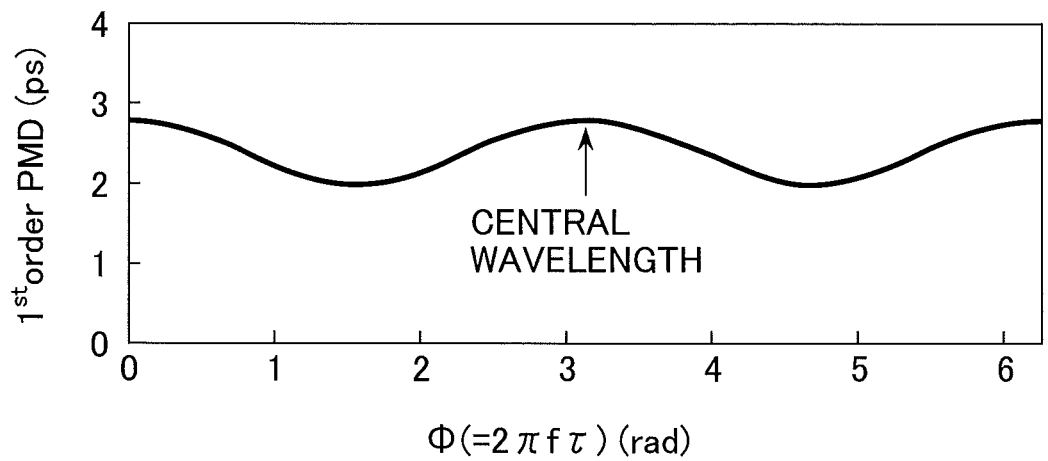
FIG. 14A is a graph plotting the first-order PMD spectrum with respect to a phase difference $\phi$.
Figure 14B:
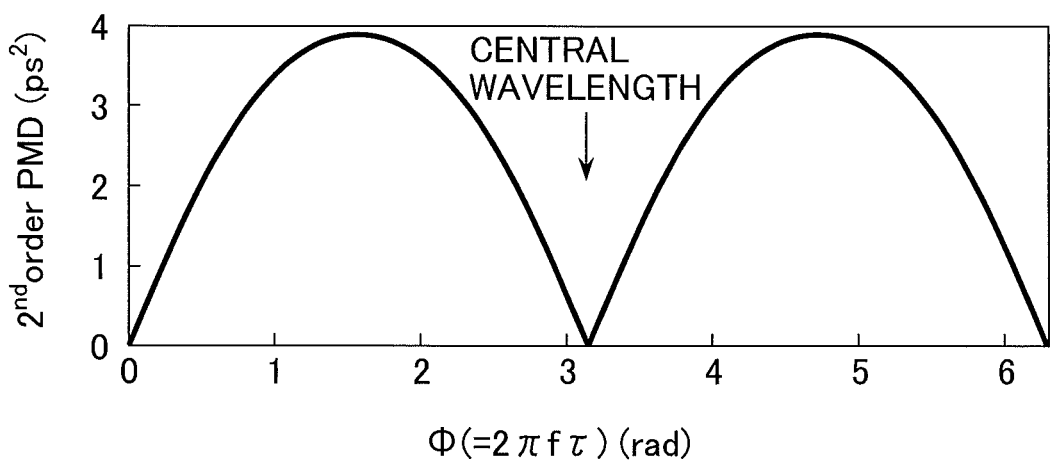
FIG. 14B is a graph plotting the second-order PMD spectrum with respect to a phase difference $\phi$.

FIGS. 14A and 14B each show a PMD spectrum representing the dependency of the magnitude of a PMD vector on a phase difference φ between the orthogonal eigen-axes generated in the DGD generators 62 and 66, where a polarization rotation amount a generated in the mode mixer 64 is equal to π/2, a polarization rotation amount β generated in the mode mixer 68 is equal to −π, and a DGD value generated in each of the DGD generators 62 and 66 is equal to 1 ps. FIGS. 14A and 14B show the first-order and the second-order PMD spectra, respectively.

In FIG. 14A, the abscissa represents the phase difference φ in units of radian, and the ordinate represents the magnitude of the first-order PMD vector in units of ps. In FIG. 14B, the abscissa represents the phase difference φ in units of radian, and the ordinate represents the magnitude of the second-order PMD vector in units of picosecond. A variation width from 0 to 2π of the phase difference φ the abscissa corresponds to a frequency range of 1 THz. The DGD is equal to $2^{3/2}\tau$, and the magnitude of the second-order PMD is equal to zero, where N is an integer, and β=−φ+Nπ.

As described above, an FSR is determined by DGD values generated in the DGD generators 62 and 66, and the central wavelength thereof can be arbitrarily shifted by the polarization rotation amount β generated in the mode mixer 68. In a wavelength having its central wavelength β=−φ+Nπ, an intended PMD spectrum property may be obtained. Therefore, by matching the central wavelength with the central wavelength of a WDM grid, a PMD-emulating apparatus is provided which can collectively evaluate a WDM signal.

Figure 15:
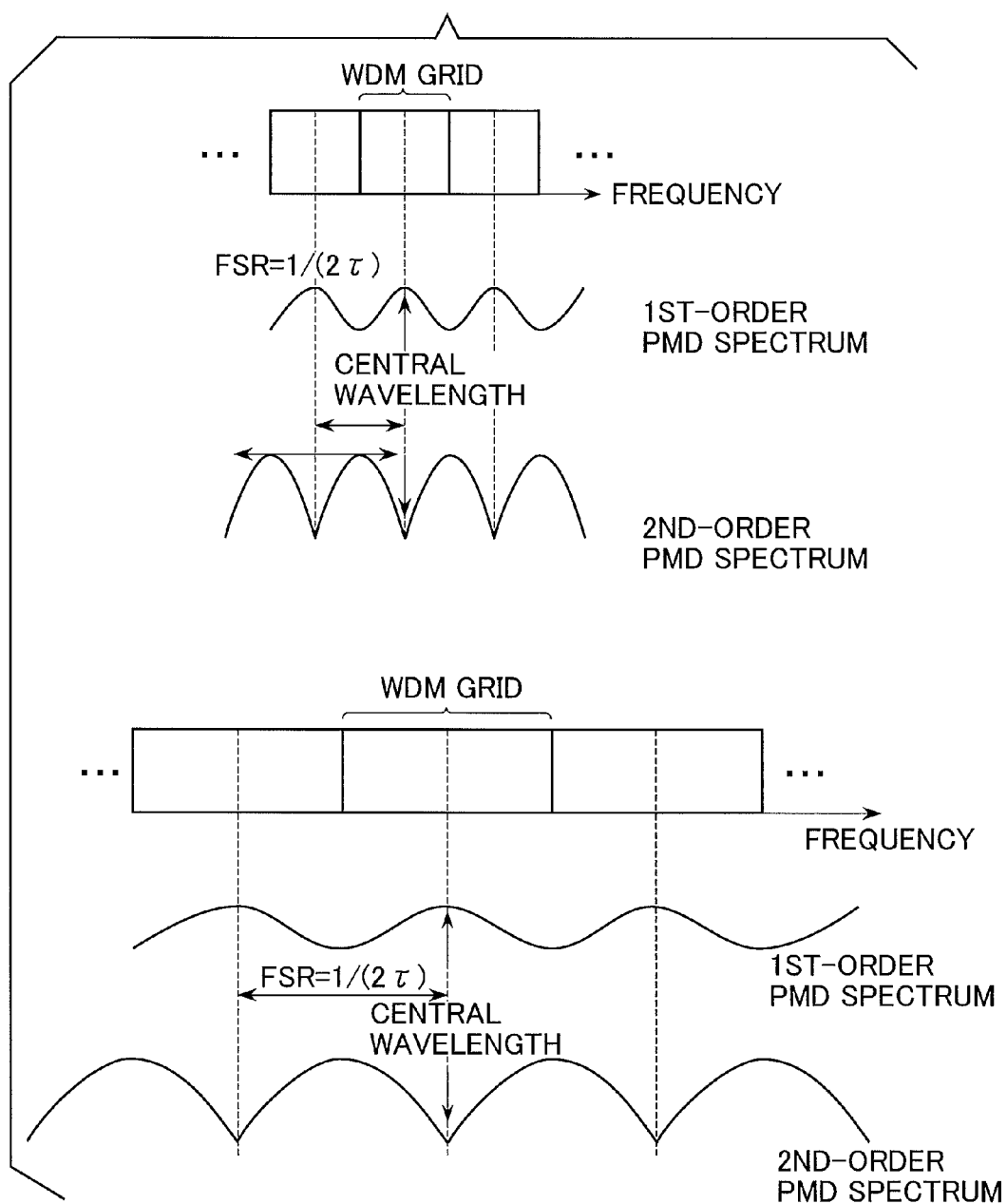
FIG. 15 shows the relationship between a WDM grid and the first-order and second-order PMD spectra.

This will be described with reference to FIG. 15. FIG. 15 shows the first-order and the second-order PMD spectra in a broader range of phase difference φ between the orthogonal eigen-axes than that shown in FIGS. 14A and 14B. The upper part of FIG. 15 shows an FSR for a larger DGD value generated in the DGD generators 62 and 66. The lower part of FIG. 15 shows a variation in the FSR due to a decrease in the DGD value. As understood from FIG. 15, by matching the central wavelength in the PMD-generating apparatus 60 with the central wavelength of a WDM grid, the PMD-emulating apparatus 146 is provided which can evaluate a WDM signal collectively.

For example, in an application where the WDM grid is set to 50 GHz, if a DGD value generated in each of the DGD generators 62 and 66 is set to 10 ps, then the WDM signal can collectively be evaluated. Similarly, in an application where the WDM grid is set to 100 GHz or 40 GHz, if the DGD value set to 5 ps or 12.5 ps, respectively, then the WDM signal can collectively be evaluated.

The entire disclosure of Japanese patent application Nos. 2011-214143 and 2012-34313 filed on Sep. 29, 2011 and Feb. 20, 2012, respectively, including the specification, claims, accompanying drawings and abstract of the disclosure, is incorporated herein by reference in its entirety.

While the present invention has been described with reference to the particular illustrative embodiments, it is not to be restricted by the embodiments. It is to be appreciated that those skilled in the art can change or modify the embodiments without departing from the scope and spirit of the present invention.

What I claim is:

1. A polarization mode dispersion (PMD) generating apparatus including a first differential group delay (DGD) generator, a first mode mixer, a second DGD generator, a second mode mixer, and a reflective mirror, which are arranged in this order, wherein
    each of said first and second DGD generators includes a DGD adjustment mechanism variably adjusting a DGD amount between orthogonal eigen-polarization modes generated in said first and second DGD generators, respectively, and
    input signal light is inputted from said first DGD generator to propagate back and forth on an optical path from said first DGD generator through said first mode mixer, said second DGD generator and said second mode mixer to said reflective mirror,
    whereby a first-order PMD is added to the input signal light with a second-order PMD canceled which was raised along with generation of the first-order PMD to generate a PMD-added optical signal; and
    wherein
    said DGD adjustment mechanisms include a first DGD adjustment mechanism adjusting a DGD amount generated in said first DGD generator and a second DGD adjustment mechanism adjusting a DGD amount generated in said second DGD generator,
    said first and second DGD adjustment mechanisms are in integral with each other to adjust the DGD amounts, and
    each of said first and second DGD adjustment mechanisms is in a form of Mach-Zehnder interferometer.

2. The apparatus in accordance with claim 1, further comprising a polarization plane controller in a stage preceding said first DGD generator, said polarization plane controller arbitrarily adjusting a state of polarization of an input signal inputted to said first DGD generator.

3. The apparatus in accordance with claim 1, wherein
said first mode mixer includes a first ¼-wavelength plate, a first phase shifter, and a second ¼-wavelength plate, which are arranged in this order in a direction from said first DGD generator to said second DGD generator, and said second mode mixer includes a second phase shifter.

4. The apparatus in accordance with claim 3, wherein said first phase shifter comprises a polarization plane rotator composed of optically transmissive ceramic responsive to a change in refraction index between orthogonal polarization components based on Kerr effect.

5. A polarization mode dispersion (PMD) generating apparatus including a first differential group delay (DGD) generator, a first mode mixer, a second DGD generator, a second mode mixer, and a reflective mirror, which are arranged in this order, wherein
each of said first and second DGD generators includes a DGD adjustment mechanism variably adjusting a DGD amount between orthogonal eigen-polarization modes generated in said first and second DGD generators, respectively, and
input signal light is inputted from said first DGD generator to propagate back and forth on an optical path from said first DGD generator through said first mode mixer, said second DGD generator and said second mode mixer to said reflective mirror,
whereby a first-order PMD is added to the input signal light with a second-order PMD canceled which was raised along with generation of the first-order PMD to generate a PMD-added optical signal; and
wherein
said DGD adjustment mechanisms include a first DGD adjustment mechanism adjusting a DGD amount generated in said first DGD generator and a second DGD adjustment mechanism adjusting a DGD amount generated in said second DGD generator,
said first and second DGD adjustment mechanisms are in integral with each other to adjust the DGD amounts, and
each of said first and second DGD adjustment mechanisms is in a form of Michelson interferometer.

6. The apparatus in accordance with claim 5, further comprising a polarization plane controller in a stage preceding said first DGD generator, said polarization plane controller arbitrarily adjusting a state of polarization of an input signal inputted to said first DGD generator.

7. The apparatus in accordance with claim 5, wherein
said first mode mixer includes a first ¼-wavelength plate, a first phase shifter, and a second ¼-wavelength plate, which are arranged in this order in a direction from said first DGD generator to said second DGD generator, and said second mode mixer includes a second phase shifter.

8. The apparatus in accordance with claim 7, wherein said first phase shifter comprises a polarization plane rotator composed of optically transmissive ceramic responsive to a change in refraction index between orthogonal polarization components based on Kerr effect.

9. A polarization mode dispersion (PMD) generating apparatus including a first differential group delay (DGD) generator, a first mode mixer, a second DGD generator, a second mode mixer, and a reflective mirror, which are arranged in this order, wherein
each of said first and second DGD generators includes a DGD adjustment mechanism variably adjusting a DGD amount between orthogonal eigen-polarization modes generated in said first and second DGD generators, respectively, and
input signal light is inputted from said first DGD generator to propagate back and forth on an optical path from said first DGD generator through said first mode mixer, said second DGD generator and said second mode mixer to said reflective mirror,
whereby a first-order PMD is added to the input signal light with a second-order PMD canceled which was raised along with generation of the first-order PMD to generate a PMD-added optical signal; and
wherein
said DGD adjustment mechanisms include a first DGD adjustment mechanism adjusting a DGD amount generated in said first DGD generator and a second DGD adjustment mechanism adjusting a DGD amount generated in said second DGD generator,
said first and second DGD adjustment mechanisms are in integral with each other to adjust the DGD amounts, and
each of said first and second DGD generators includes:
a plurality of birefringent media arranged in series and generating different DGD amounts from one another; and
90-degree variable polarization rotators arranged between said birefringent media to rotate and switch by 90 degrees electric-field components in directions of fast and slow axes of light propagating through crystal of said birefringent medium.

10. The apparatus in accordance with claim 9, further comprising a polarization plane controller in a stage preceding said first DGD generator, said polarization plane controller arbitrarily adjusting a state of polarization of an input signal inputted to said first DGD generator.

11. The apparatus in accordance with claim 9, wherein
said first mode mixer includes a first ¼-wavelength plate, a first phase shifter, and a second ¼-wavelength plate, which are arranged in this order in a direction from said first DGD generator to said second DGD generator, and said second mode mixer includes a second phase shifter.

12. The apparatus in accordance with claim 11, wherein said first phase shifter comprises a polarization plane rotator composed of optically transmissive ceramic responsive to a change in refraction index between orthogonal polarization components based on Kerr effect.

* * * * *